(12) United States Patent
Imai

(10) Patent No.: US 6,483,650 B1
(45) Date of Patent: Nov. 19, 2002

(54) INTEGRATED OPTICAL ELEMENT, OPTICAL PICKUP, AND OPTICAL DISK DEVICE

(75) Inventor: Satoshi Imai, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/509,804

(22) PCT Filed: Aug. 3, 1999

(86) PCT No.: PCT/JP99/04192

§ 371 (c)(1),
(2), (4) Date: Apr. 3, 2000

(87) PCT Pub. No.: WO00/08640

PCT Pub. Date: Feb. 17, 2000

(30) Foreign Application Priority Data

Aug. 4, 1998 (JP) ............................................ 10-220526

(51) Int. Cl.⁷ .............................. G02B 7/02; G11B 7/00
(52) U.S. Cl. ............. 359/814; 369/112.04; 369/112.12; 369/112.17; 369/44.12; 369/44.23; 369/103
(58) Field of Search .......................... 359/29, 618, 814; 369/103, 44.23, 44.12, 112.04, 112.12, 112.17, 109

(56) References Cited

U.S. PATENT DOCUMENTS 5,629,919 A * 5/1997 Hayashi et al. ........ 369/112.17
6,069,863 A * 5/2000 Shimizu et al. .......... 369/44.14
6,144,623 A * 11/2000 Inoue et al. ............. 369/44.23
6,212,150 B1 * 4/2001 Inoue et al. ............. 369/44.23

FOREIGN PATENT DOCUMENTS

| EP | 0583036 B1 | 7/1998 | |
| JP | 5-54411 | 3/1993 | ............ G11B/7/09 |
| JP | 5-054411 | 3/1993 | |
| JP | 06-195727 | * 7/1994 | |
| JP | 11-73658 | 3/1999 | ............ G11B/7/09 |
| JP | 11-102526 | 4/1999 | ............ G11B/7/09 |

\* cited by examiner

*Primary Examiner*—Loha Ben
(74) *Attorney, Agent, or Firm*—Rader, Fishman, & Grauer PLLC; Ronald P. Kananen, Esq.

(57) ABSTRACT

A hologram 48 as optical path branching element has two hologram areas 48b and 48c for diffracting a return light beam into different directions, and a boundary 48a between them is inclined at a predetermined angle with respect to the direction corresponding to the direction of radius of the optical disc 11. The light diffracted by the one hologram area 48b is received by light-receiving sections A1 and A2 of a photodetector IC 44, and the light diffracted by the other hologram area 48c is received by light-receiving sections A3 and A4. With the above-described structure, a position deviation of an objective lens 27 at the time of access to a desired recording track on an optical disc 11 can be detected by finding the difference between the light quantity of the light received by the light-receiving sections A1 and A2 of the photodetector IC 44 and the light quantity of the light received by the light-receiving sections A3 and A4.

18 Claims, 14 Drawing Sheets

INTEGRATED OPTICAL ELEMENT, OPTICAL PICKUP, AND OPTICAL DISK DEVICE

TECHNICAL FIELD

This invention relates to an integrated optical element used for an optical pickup for recording and/or reproduction of signals by irradiating with a light beam a signal recording surface of an optical type disc (hereinafter referred to as optical disc) such as a mini disc (MD), a magneto-optical disc (MO), a compact disc (CD) or a CD-ROM, an optical pickup using this integrated optical element, and an optical disc device having this optical pickup.

BACKGROUND ART

Conventionally, an optical pickup constituted, for example, as shown in FIG. 1 is proposed as an optical pickup for an optical disc. The optical pickup 1 shown in FIG. 1 has a semiconductor laser element 2 as a light source, an optical member 3 made of a transparent material such as glass or plastics, an objective lens 4 for converging a light, and a photodetector 5 for receiving a light and converting the light to an electric signal.

Of these elements constituting the optical pickup 1, the light-emitting element 2, the optical member 3 and the photodetector 5 are integrated as an integrated element, which is provided in the state of being fixed to a base, not shown. The objective lens 4 is provided on the base via a biaxial actuator, not shown. As the biaxial actuator is driven, the objective lens 4 is minutely moved in biaxial directions, that is, in the direction of radius of an optical disc D and in the direction toward and away from the optical disc D.

In this optical pickup, as the base is fed in the direction of radius of the optical disc D by the driving of a thread feed motor, not shown, a desired recording track on the optical disc can be accessed.

In this optical pickup 1, the optical member 3 has two surfaces in parallel to each other. These two surfaces are arranged to be substantially perpendicular to the optical axis of the light beam from the semiconductor laser element 2. On a first surface (lower-center side in FIG. 1) of the optical member 3 on the side of the semiconductor laser element 2, a grating 3a for diffracting a light beam directed toward the optical disc D into the direction corresponding to the direction along the recording track on the optical disc D and for splitting the light beam into a plurality of beams including at least a main beam and two side beams is formed on the optical axis of the light beam from the semiconductor laser element 2.

Also, on a second surface (upper-center surface in FIG. 1) of the optical member 3 on the side of the optical disc D, a hologram 3b for diffracting a return light beam reflected from the signal recording surface of the optical disc D and for guiding the return light beam to the photodetector 5 is formed on the optical axis of the light beam from the semiconductor laser element 2.

The hologram 3b functions as optical path branching means for branching the optical path of the return light beam directed toward the photodetector 5 from the optical path of the light beam directed toward the optical disc D, by diffracting the return light beam from the optical disc D incident on the second surface of the optical member 3 and thus directing the return light beam toward the photodetector 5.

The hologram 3b has two hologram areas 3b-1 and 3b-2 for diffracting the incident return light beam by different diffraction angles, respectively, as shown in FIG. 1. The boundary between these hologram areas 3b-1 and 3b-2 is formed on the second surface of the optical member 3 so as to be substantially coincident with the direction corresponding to the direction of radius of the optical disc D. The return light beam from the optical disc D becomes incident on the hologram 3b with its center located on the boundary between the two hologram areas 3b-1 and 3b-2, and is bisected along the boundary. The bisected portions are diffracted by different diffraction angles, respectively.

That is, the hologram 3b also functions as return light beam splitting means for bisecting the incident return light beam along a splitting line in the direction corresponding to the direction of radius of the optical disc D.

The photodetector 5 has a center light-receiving section 5a for receiving a return light of the main beam, from among the plurality of beams generated by the grating 3a, and light-receiving sections e and f for receiving return lights of the side beams, provided on both sides of the center light-receiving section 5a, specifically, on both sides of the direction corresponding to the direction along the recording track on the optical disc D, as shown in FIG. 1. The center light-receiving section 5a further has four light-receiving sections a, b, c and d which are divided by a division line d1 in the direction corresponding to the direction of radius of the optical disc D and a division line d2 in the direction along the recording track on the optical disc D.

The division line d1 on the center light-receiving section 5a extends in the direction corresponding to the direction of radius of the optical disc D along the direction of diffraction of the hologram 3b in order to prevent generation of any deviation of the focusing error signal level of a light spot in a focused state due to a change in the oscillation wavelength of the semiconductor laser element 2 or due to a change in the refractive index of the optical member 3 by a temperature change.

In this optical pickup 1, the light beam emitted from the semiconductor laser element 2 becomes incident on the optical member 3 from its first surface, then is split into a plurality of beams by the grating 3a, and then passes through the optical member 3. The optical beam which has passed through the optical member 3 is converged by the objective lens 4 and is cast as a fine light spot onto the signal recording surface of the optical disc D. In this case, three light spots are formed on the signal recording surface of the optical disc D by the main beam and two side beams generated by the grating 3a. In FIG. 1, only the main beam is shown.

The light beams cast on the signal recording surface of the optical disc D reflected by the signal recording surface of the optical disc D so as to be return light beams. The return light beams pass again through the objective lens 4 and become incident on the optical member 3 from its second surface. The return light beams incident on the optical member 3 are diffracted by the hologram 3b formed on the second surface of the optical member 3. Specifically, the return light beams become incident on the hologram 3b with their centers located on the boundary between the two hologram areas 3b-1 and 3b-2, and the portions incident on the individual hologram areas 3b-1 and 3b-2 are diffracted by different diffraction angles, respectively. The return light beams diffracted by the hologram areas 3b-1 and 3b-2 of the hologram 3b pass through the optical member 3 so as to be directed toward the photodetector.

Of the return light beams directed toward the photodetector 5, the return light beam which is a return light of the main beam and is diffracted by the one hologram area 3b-1 of the hologram 3b becomes incident on the two light receiving sections a and b of the center light-receiving section 5a of the photodetector 5. Of the return light beams directed toward the photodetector 5, the return light beam which is a return light of the main beam and is diffracted by the other hologram area 3b-2 of the hologram 3b becomes incident on the remaining two light receiving sections c and d of the center light-receiving section 5a of the photodetector 5. Of the return light beams directed toward the photodetector 5, the return light beams of the side beams become incident on the light-receiving sections e and f of the photodetector 5.

The photodetector 5 converts the lights incident on the light-receiving sections a, b, c, d, e and f to electric signals, and supplies the resultant signals to a signal processing circuit, not shown. The detection signals from the photodetector 5 are amplified by head amplifiers in the signal processing circuit so as to be output signals Sa, Sb, Sc, Sd, Se and Sf, and predetermined arithmetic processing is performed thereon by an arithmetic circuit. Thus, a reproduction signal RF0 is generated. Also, a focusing error signal FE0 is generated by a so-called Foucault method and a tracking error signal TR0 is generated by a three-beam method.

The reproduction signal RF0 is calculated, for example, by the arithmetic circuit carrying out arithmetic processing with the following equation (1).

$$RF0 = (Sa+Sb)+(Sc+Sd) \quad (1)$$

The focusing error signal FE0 is calculated, for example, by the arithmetic circuit carrying out arithmetic processing with the following equation (2), (3) or (4).

$$FE0 = Sa-Sb \quad (2)$$

$$FE0 = Sc-Sd \quad (3)$$

$$FE0 = (Sa+Sd)-(Sc+Sb) \quad (4)$$

The tracking error signal TR0 is calculated, for example, by the arithmetic circuit carrying out arithmetic processing with the following equation (5).

$$TR0 = Se-Sf \quad (5)$$

On the basis of the focusing error signal FE0 thus generated, the optical pickup 1 carries out focusing servo for driving the biaxial actuator to minutely move the objective lens 4 in the direction toward and away from the optical disc D and thus controls the focal point of the light beam converged by the objective lens 4 so as to be constantly located on the signal recording surface of the optical disc D.

In addition, on the basis of the tracking error signal TR0 generated in the above-described manner, the optical pickup 1 carries out tracking servo for driving the biaxial actuator to minutely move the objective lens 4 in the direction of radius of the optical disc D and thus causes the spot of the light beam converged by the objective lens 4 to follow the recording track on the optical disc D.

By thus carrying out focusing servo and tracking servo while recording/reproducing signals to/from the optical disc D, the optical pickup 1 can carry out appropriate signal recording/reproduction even in the case where the optical disc D is fluctuated or tilted.

Meanwhile, in the case where signal recording/reproduction is to be carried out with the optical disc D in the optical pickup 1, the base must be first fed in the direction of radius of the optical disc to access a predetermined recording track, as described above, in the state where tracking servo is off.

The objective lens 4 is provided movably on the base via the biaxial actuator as described above. Therefore, when the base is fed in the direction of radius of the optical disc D or when the feed operation is stopped, the position of the objective lens with respect to the base is deviated in the direction of radius of the optical disc D (to the inner side or outer side of the optical disc D) from the normal position because of inertia, as shown in FIG. 2.

The deviation of the objective lens 4 from the normal position is eliminated with the lapse of a predetermined time period. However, during this time period for recovering the position of the objective lens 4, recording/reproduction of signals to/from the optical disc cannot be carried out. This is one element that substantially disturbs the high-speed access property of the optical pickup 1.

To realize the high-speed property of such optical pickup 1, the position of the objective lens 4 may be instantaneously recovered by detecting the deviation of the objective lens 4 from the normal position, then feeding the detected deviation back to the biaxial actuator, and controlling the driving of the biaxial actuator to eliminate the deviation of the objective lens 4.

To detect the deviation of the objective lens 4 from the normal position, there is considered, for example, a technique of attaching a position sensor to the objective lens 4 so as to detect the actual position of the objective lens 4 by the position sensor and thus detecting the position deviation of the objective lens 4 from the actual position of the objective lens 4 and the quantity of feeding of the base.

However, this technique requires the position sensor for detecting the position of the objective lens 4 to be separately provided in the optical pickup 1, and therefore causes problems such as the increase in the number of components, increase in size of the optical pickup 1 and rise in cost.

DISCLOSURE OF THE INVENTION

In view of the foregoing status of the art, it is an object of the present invention to provide an optical pickup which realizes the high-speed access property by appropriately and simply detecting the position deviation of the objective lens as the light beam converging means at the time of access without adding any new component, an integrated optical element used therefor, and an optical disc device having this optical pickup.

An integrated optical element according to the present invention, used for an optical pickup for carrying out recording and/or reproduction of signals by irradiating a signal recording surface of an optical disc with a light beam, includes: a light source for emitting the light beam; a photodetector having a light-receiving section for receiving a return light beam reflected by the signal recording surface of the optical disc; a package member for housing the light source and the photodetector therein; an optical member arranged on the package member for transmitting the light beam emitted from the light source and for transmitting the return light beam directed toward the photodetector; and optical path branching means integrally formed with the optical member for separating the optical path of the light beam emitted from the light source and the optical path of the return light beam directed toward the photodetector.

In this integrated optical element, the optical path branching means has at least two diffraction areas for diffracting the return light beam reflected by the signal recording surface of the optical disc, into different directions, respectively, and the boundary between the diffraction areas is inclined at a predetermined angle with respect to the direction corresponding to the direction of radius of the optical disc. At least one light-receiving section of the photodetector is divided into a portion for receiving a return light beam diffracted by one diffraction area of the optical path branching means and a portion for receiving a return light beam diffracted by the other diffraction area.

In the integrated optical element according to the present invention, the light source is housed inside the package member and emits the light beam for irradiating the signal recording surface of the optical disc. The light beam emitted from the light source is transmitted through the optical member provided on the package member. Then, the light beam transmitted through the optical member is converged by light beam converging means of the optical pickup and then cast onto the signal recording surface of the optical disc.

The light beam cast on the signal recording surface of the optical disc is reflected by the signal recording surface of the optical disc and thus becomes a return light beam including a signal component. The return light beam passes again through the light beam converging means and then becomes incident on the optical member.

The return light beam incident on the optical member has its optical path separated from the optical path of the light beam emitted from the light source, by the optical path branching means formed integrally with the optical member. Specifically, the optical path branching means includes, for example, a hologram formed on the surface of the optical member. As the return light beam is diffracted by the hologram into the direction toward the photodetector, the optical path of the return light beam is separated from the optical path of the light beam emitted from the light source.

Since the optical path branching means has at least two diffraction areas for diffracting the return light beam in different directions, the return light beams incident on the respective diffraction areas of the optical path branching means are diffracted into different directions by the diffraction areas of the optical path branching means, then transmitted through the optical member, and directed toward the photodetector housed in the package member.

Since at least one light receiving section of the photodetector is divided into the portion for receiving the return light beam diffracted by one diffraction area of the optical path branching means and the portion for receiving the return light beam diffracted by the other diffraction area, the return light beams diffracted into different directions by the respective diffraction areas of the optical path branching means are received by the corresponding portions of the light-receiving section of the photodetector.

Thus, on the basis of the detection signal from the light-receiving section of the photodetector, a reproduction signal is generated and a focusing error signal is generated by a so-called Foucault method.

Meanwhile, in the case where the position of the light beam converging means with respect to the integrated optical element is deviated in the direction of radius of the optical disc from the normal position at the time of access to a desired recording track on the optical disc, the spot of the return light beam incident on the optical member is deviated in the direction corresponding to the direction of radius of the optical disc, on the optical path branching means.

In the integrated optical element according to the present invention, the optical path branching means has at least two diffraction areas for diffracting the return light beam into different directions, and the boundary between these diffraction areas is inclined at a predetermined angle with respect to the direction corresponding to the direction of radius of the optical disc. Therefore, in the case where the position of the light beam converging means is deviated in the direction of radius of the optical disc from the normal position, the return light beam is split asymmetrically by the optical path branching means. The individual parts of the return light beam generated by asymmetrical splitting by the optical path branching means are received by the corresponding portions of the light-receiving section of the photodetector. Therefore, the position deviation of the light beam converging means with respect to the integrated optical element can be detected on the basis of the detection signal from the light-receiving section of the photodetector.

According to the integrated optical element of the present invention, since the position deviation of the light beam converging means with respect to the integrated optical element at the time of access to a desired recording track on the optical disc can be detected in the above-described manner, the optical pickup using this integrated optical element can realize the high-speed access property.

Also, in this integrated optical element, the optical path branching means for separating the optical path of the return light beam directed toward the photodetector from the optical path of the light beam emitted from the light source and for generating a focusing error signal by the Foucault method is used for detecting the position deviation of the light beam converging means with respect to the integrated optical element, instead of additionally providing any means for detecting the position deviation of the light beam converging means. Therefore, the optical pickup using this integrated optical element can realize the high-speed access property by appropriately and simply detecting the position deviation of the light beam converging means, without causing the increase in the number of components, the increase in the size of the device itself and the rise in cost.

In the integrated optical element according to the present invention, it is desired that light beam splitting means for diffracting the light beam directed toward the optical disc and for splitting the light beam into a plurality of beams including a main beam and two side beams is formed integrally with the optical member.

As the light beam splitting means for diffracting and splitting the light beam directed toward the optical disc into a plurality of beams is provided, as described above, the integrated optical element according to the present invention forms spots of the main beam and two side beams onto the signal recording surface of the optical disc and detects the return light beams thereof. Thus, a tracking error signal can be generated by a so-called three-beam method.

Moreover, as the light beam splitting means is formed integrally with the optical member, as described above, the integrated optical element according to the present invention can realize miniaturization of the integrated optical element itself and miniaturization of the optical pickup using this integrated optical element.

Also, in the integrated optical element according to the present invention, it is desired that at least one light-receiving section of the photodetector is divided by division lines substantially parallel to the boundary of the diffraction areas of the optical path branching means.

As at least one light-receiving section of the photodetector is divided by the division lines substantially parallel to the boundary of the diffraction areas of the optical path branching means, as described above, the integrated optical element according to the present invention can effectively restrain generation of any deviation of the signal level of the focusing error signal due to a position change of the return light spot and detect an appropriate focusing error signal even in the case where the position of the return light spot of the light beam in a focused state on the photodetector is somewhat changed by a change in the oscillation wavelength of the light source or by a change in the refractive index of the optical member due to a temperature change.

Another integrated optical element according to the present invention, used for an optical pickup for carrying out recording and/or reproduction of signals by irradiating a signal recording surface of an optical disc with a light beam, includes: a light source for emitting the light beam; a photodetector having a light-receiving section for receiving a return light beam reflected by the signal recording surface of the optical disc; a package member for housing the light source and the photodetector therein; an optical member arranged on the package member for transmitting the light beam emitted from the light source and for transmitting the return light beam directed toward the photodetector; optical path branching means integrally formed with the optical member for separating the optical path of the light beam emitted from the light source and the optical path of the return light beam reflected by the signal recording surface of the optical disc; and return light beam splitting means integrally formed with the optical member for splitting the return light beam passed through the optical path branching means into at least two beams.

In this integrated optical element, the return light beam splitting means has at least two surfaces having different normal vectors, and the boundary between these surfaces is inclined at a predetermined angle with respect to a direction corresponding to the direction of radius of the optical disc. At least one light-receiving section of the photodetector is divided into a portion for receiving one return light beam generated by the return light beam splitting means and a portion for receiving the other return light beam.

In this another integrated optical element according to the present invention, the light source is housed inside the package member and emits the light beam for irradiating the signal recording surface of the optical disc. The light beam emitted from the light source is transmitted through the optical member provided on the package member. Then, the light beam transmitted through the optical member is converged by light beam converging means of the optical pickup and then cast onto the signal recording surface of the optical disc.

The light beam cast on the signal recording surface of the optical disc is reflected by the signal recording surface of the optical disc and thus becomes a return light beam including a signal component. The return light beam passes again through the light beam converging means and then becomes incident on the optical member.

The return light beam incident on the optical member has its optical path separated from the optical path of the light beam emitted from the light source, by the optical path branching means formed integrally with the optical member. Specifically, the optical path branching means includes, for example, a hologram formed on the surface of the optical member. As the return light beam is diffracted by the hologram into the direction toward the photodetector, the optical path of the return light beam is separated from the optical path of the light beam emitted from the light source.

The return light beam having its optical path branched by the optical path branching means is then split into at least two beams by the return light beam splitting means integrally formed with the optical member.

Since the return light beam splitting means has at least two surfaces having different normal vectors, the return light beam incident on the return light beam splitting means is split along the boundary between the surfaces. The beams generated by splitting proceed in different directions in accordance with the normal vectors of the surfaces on which they are incident, and are directed toward the photodetector housed in the package member.

Since at least one light receiving section of the photodetector is divided into the portion for receiving one return light beam generated by the return light beam splitting means and the portion for receiving the other return light beam, the return light beams generated by the return light beam splitting means are received by the corresponding portions of the light-receiving section of the photodetector.

Thus, on the basis of the detection signal from the light-receiving section of the photodetector, a reproduction signal is generated and a focusing error signal is generated by a so-called Foucault method.

Meanwhile, in the case where the position of the light beam converging means with respect to the integrated optical element is deviated in the direction of radius of the optical disc from the normal position at the time of access to a desired recording track on the optical disc, the spot of the return light beam incident on the optical member is deviated in the direction corresponding to the direction of radius of the optical disc, on the optical path branching means.

In this another integrated optical element according to the present invention, the return light beam splitting means has at least two surfaces of different normal vectors and the boundary between these surfaces is inclined at a predetermined angle with respect to the direction corresponding to the direction of radius of the optical disc. Therefore, in the case where the position of the light beam converging means is deviated in the direction of radius of the optical disc from the normal position, the return light beam is split asymmetrically by the return light beam splitting means. The individual parts of the return light beam generated by asymmetrical splitting by the return light beam splitting means are received by the corresponding portions of the light-receiving section of the photodetector. Therefore, the position deviation of the light beam converging means with respect to the integrated optical element can be detected on the basis of the detection signal from the light-receiving section of the photodetector.

According to this another integrated optical element of the present invention, since the position deviation of the light beam converging means with respect to the integrated optical element at the time of access to a desired recording track on the optical disc can be detected in the above-described manner, the optical pickup using this integrated optical element can realize the high-speed access property.

Also, in this another integrated optical element, the return light beam splitting means for generating a focusing error signal by the Foucault method is used for detecting the position deviation of the light beam converging means with respect to the integrated optical element, instead of additionally providing any means for detecting the position deviation of the light beam converging means. Therefore, the optical pickup using this integrated optical element can realize the high-speed access property by appropriately and simply detecting the position deviation of the light beam converging means, without causing the increase in the number of components, the increase in the size of the device itself and the rise in cost.

In this another integrated optical element according to the present invention, it is desired that light beam splitting means for diffracting the light beam directed toward the optical disc and for splitting the light beam into a plurality of beams including a main beam and two side beams is formed integrally with the optical member.

As the light beam splitting means for diffracting and splitting the light beam directed toward the optical disc into a plurality of beams is provided, as described above, this another integrated optical element according to the present invention forms spots of the main beam and two side beams onto the signal recording surface of the optical disc and detects the return light beams thereof. Thus, a tracking error signal can be generated by a so-called three-beam method.

Moreover, as the light beam splitting means is formed integrally with the optical member, as described above, this another integrated optical element according to the present invention can realize miniaturization of the integrated optical element itself and miniaturization of the optical pickup using this integrated optical element.

Also, in this another integrated optical element according to the present invention, it is desired that at least one light-receiving section of the photodetector is divided by division lines substantially parallel to the boundary of the return light beam splitting means.

As at least one light-receiving section of the photodetector is divided by the division lines substantially parallel to the boundary of the diffraction areas of the optical path branching means, as described above, the integrated optical element according to the present invention can effectively restrain generation of any deviation of the signal level of the focusing error signal due to a position change of the return light spot and detect an appropriate focusing error signal even in the case where the position of the return light spot of the light beam in a focused state on the photodetector is somewhat changed by a change in the oscillation wavelength of the light source or by a change in the refractive index of the optical member due to a temperature change.

An optical pickup according to the present invention for carrying out recording and/or reproduction of signals by irradiating a signal recording surface of an optical disc with a light beam includes: a light source for emitting the light beam; light beam converging means for converging the light beam emitted from the light source and for irradiating the signal recording surface of the optical disc with the converged light beam; a photodetector having a light-receiving section for receiving a return light beam reflected by the signal recording surface of the optical disc; an optical member arranged between the light source and photodetector on one side and the light beam converging means on the other side, for transmitting the light beam emitted from the light source and for transmitting the return light beam directed toward the photodetector; optical path branching means integrally formed with the optical member for separating the optical path of the light beam emitted from the light source and the optical path of the return light beam directed toward the photodetector; and a biaxial actuator for moving the light beam converging means into biaxial directions, that is, the direction of radius of the optical disc and the direction toward and away from the optical disc.

In this optical pickup, the optical path branching means has at least two diffraction areas for diffracting the return light beam reflected by the signal recording surface of the optical disc, into different directions, respectively, and the boundary between the diffraction areas is inclined at a predetermined angle with respect to the direction corresponding to the direction of radius of the optical disc. At least one light-receiving section of the photodetector is divided into a portion for receiving a return light beam diffracted by one diffraction area of the optical path branching means and a portion for receiving a return light beam diffracted by the other diffraction area.

In the optical pickup according to the present invention, the light beam emitted from the light source is transmitted through the optical member and directed toward the light beam converging means. The light beam is then converged by light beam converging means and then cast onto the signal recording surface of the optical disc.

In the case where the spot of the light beam cast on the signal recording surface of the optical disc is deviated from a predetermined recording track on the signal recording surface of the optical disc, or in the case where no focal point is formed on the signal recording surface of the optical disc, the biaxial actuator is driven on the basis of a tracking error signal or a focusing error signal, and the light beam converging means is moved by the biaxial actuator into the direction of radius of the optical disc or into the direction toward and away from the optical disc. Thus, the spot of the light beam converged by the light beam converging means and cast onto the signal recording surface of the optical disc constantly follows a predetermined recording track on the signal recording surface of the optical disc and forms a focal point on the signal recording surface of the optical disc.

The light beam cast on the signal recording surface of the optical disc is reflected by the signal recording surface of the optical disc and thus becomes a return light beam including a signal component. The return light beam passes again through the light beam converging means and then becomes incident on the optical member.

The return light beam incident on the optical member has its optical path separated from the optical path of the light beam emitted from the light source, by the optical path branching means formed integrally with the optical member. Specifically, the optical path branching means includes, for example, a hologram formed on the surface of the optical member. As the return light beam is diffracted by the hologram into the direction toward the photodetector, the optical path of the return light beam is separated from the optical path of the light beam emitted from the light source.

Since the optical path branching means has at least two diffraction areas for diffracting the return light beam in different directions, the return light beams incident on the respective diffraction areas of the optical path branching means are diffracted into different directions by the diffraction areas of the optical path branching means, then transmitted through the optical member, and directed toward the photodetector.

Since at least one light receiving section of the photodetector is divided into the portion for receiving the return light beam diffracted by one diffraction area of the optical path branching means and the portion for receiving the return light beam diffracted by the other diffraction area, the return light beams diffracted into different directions by the respective diffraction areas of the optical path branching means are received by the corresponding portions of the light-receiving section of the photodetector.

Thus, on the basis of the detection signal from the light-receiving section of the photodetector, a reproduction signal is generated and a focusing error signal is generated by a so-called Foucault method.

Meanwhile, in the case where the position of the light beam converging means with respect to the optical member is deviated in the direction of radius of the optical disc from the normal position at the time of access to a desired recording track on the optical disc, the spot of the return light beam incident on the optical member is deviated in the direction corresponding to the direction of radius of the optical disc, on the optical path branching means.

In the optical pickup according to the present invention, the optical path branching means has at least two diffraction areas for diffracting the return light beam into different directions, and the boundary between these diffraction areas is inclined at a predetermined angle with respect to the direction corresponding to the direction of radius of the optical disc. Therefore, in the case where the position of the light beam converging means is deviated in the direction of radius of the optical disc from the normal position, the return light beam is split asymmetrically by the optical path branching means. The individual parts of the return light beam generated by asymmetrical splitting by the optical path branching means are received by the corresponding portions of the light-receiving section of the photodetector. Therefore, the position deviation of the light beam converging means with respect to the optical member can be detected on the basis of the detection signal from the light-receiving section of the photodetector.

According to the optical pickup of the present invention, since the position deviation of the light beam converging means with respect to the optical member at the time of access to a desired recording track on the optical disc can be detected in the above-described manner, the position of the light beam converging means can be instantaneously recovered to secure the accuracy and stability of the access operation and to realize the high-speed access property.

Also, in this optical pickup according to the present invention, the optical path branching means for separating the optical path of the return light beam directed toward the photodetector from the optical path of the light beam emitted from the light source and for generating a focusing error signal by the Foucault method is used for detecting the position deviation of the light beam converging means with respect to the optical member, instead of additionally providing any means for detecting the position deviation of the light beam converging means. Therefore, the optical pickup can realize the high-speed access property by appropriately and simply detecting the position deviation of the light beam converging means, without causing the increase in the number of components, the increase in the size of the device itself and the rise in cost.

Another optical pickup according to the present invention for carrying out recording and/or reproduction of signals by irradiating a signal recording surface of an optical disc with a light beam includes: a light source for emitting the light beam; light beam converging means for converging the light beam emitted from the light source and for irradiating the signal recording surface of the optical disc with the converged light beam; a photodetector having a light-receiving section for receiving a return light beam reflected by the signal recording surface of the optical disc; an optical member arranged between the light source and photodetector on one side and the light beam converging means on the other side, for transmitting the light beam emitted from the light source and for transmitting the return light beam directed toward the photodetector; optical path branching means integrally formed with the optical member for separating the optical path of the light beam emitted from the light source and the optical path of the return light beam reflected by the signal recording surface of the optical disc; return light beam splitting means integrally formed with the optical member for splitting the return light beam passed through the optical path branching means into at least two beams; and a biaxial actuator for moving the light beam converging means into biaxial directions, that is, the direction of radius of the optical disc and the direction toward and away from the optical disc.

In this optical pickup, the return light beam splitting means has at least two surfaces having different normal vectors, and the boundary between these surfaces is inclined at a predetermined angle with respect to a direction corresponding to the direction of radius of the optical disc. At least one light-receiving section of the photodetector is divided into a portion for receiving one return light beam generated by the return light beam splitting means and a portion for receiving the other return light beam.

In this another optical member according to the present invention, the light beam emitted from the light source is transmitted through the optical member and directed toward the light beam converging means. Then, the light beam is converged by light beam converging means and then cast onto the signal recording surface of the optical disc.

In the case where the spot of the light beam cast on the signal recording surface of the optical disc is deviated from a predetermined recording track on the signal recording surface of the optical disc, or in the case where no focal point is formed on the signal recording surface of the optical disc, the biaxial actuator is driven on the basis of a tracking error signal or a focusing error signal, and the light beam converging means is moved by the biaxial actuator into the direction of radius of the optical disc or into the direction toward and away from the optical disc. Thus, the spot of the light beam converged by the light beam converging means and cast onto the signal recording surface of the optical disc constantly follows a predetermined recording track on the signal recording surface of the optical disc and forms a focal point on the signal recording surface of the optical disc.

The light beam cast on the signal recording surface of the optical disc is reflected by the signal recording surface of the optical disc and thus becomes a return light beam including a signal component. The return light beam passes again through the light beam converging means and then becomes incident on the optical member.

The return light beam incident on the optical member has its optical path separated from the optical path of the light beam emitted from the light source, by the optical path branching means formed integrally with the optical member. Specifically, the optical path branching means includes, for example, a hologram formed on the surface of the optical member. As the return light beam is diffracted by the hologram into the direction toward the photodetector, the optical path of the return light beam is separated from the optical path of the light beam emitted from the light source.

The return light beam having its optical path branched by the optical path branching means is then split into at least two beams by the return light beam splitting means integrally formed with the optical member.

Since the return light beam splitting means has at least two surfaces having different normal vectors, the return light beam incident on the return light beam splitting means is split along the boundary between the surfaces. The beams generated by splitting proceed in different directions in accordance with the normal vectors of the surfaces on which they are incident, and are directed toward the photodetector.

Since at least one light receiving section of the photodetector is divided into the portion for receiving one return light beam generated by the return light beam splitting means and the portion for receiving the other return light beam, the return light beams generated by the return light beam splitting means are received by the corresponding portions of the light-receiving section of the photodetector.

Thus, on the basis of the detection signal from the light-receiving section of the photodetector, a reproduction signal is generated and a focusing error signal is generated by a so-called Foucault method.

Meanwhile, in the case where the position of the light beam converging means with respect to the optical member is deviated in the direction of radius of the optical disc from the normal position at the time of access to a desired recording track on the optical disc, the spot of the return light beam incident on the optical member is deviated in the direction corresponding to the direction of radius of the optical disc, on the optical path branching means.

In this another optical pickup according to the present invention, the return light beam splitting means has at least two surfaces of different normal vectors and the boundary between these surfaces is inclined at a predetermined angle with respect to the direction corresponding to the direction of radius of the optical disc. Therefore, in the case where the position of the light beam converging means is deviated in the direction of radius of the optical disc from the normal position, the return light beam is split asymmetrically by the return light beam splitting means. The individual parts of the return light beam generated by asymmetrical splitting by the return light beam splitting means are received by the corresponding portions of the light-receiving section of the photodetector. Therefore, the position deviation of the light beam converging means with respect to the optical member can be detected on the basis of the detection signal from the light-receiving section of the photodetector.

According to this another optical pickup of the present invention, since the position deviation of the light beam converging means with respect to the optical member at the time of access to a desired recording track on the optical disc can be detected in the above-described manner, the position of the light beam converging means can be instantaneously recovered to secure the accuracy and stability of the access operation and to realize the high-speed access property.

Also, in this another optical pickup according to the present invention, the return light beam splitting means for generating a focusing error signal by the Foucault method is used for detecting the position deviation of the light beam converging means with respect to the optical member, instead of additionally providing any means for detecting the position deviation of the light beam converging means. Therefore, the optical pickup can realize the high-speed access property by appropriately and simply detecting the position deviation of the light beam converging means, without causing the increase in the number of components, the increase in the size of the device itself and the rise in cost.

An optical disc device according to the present invention includes: disc rotating means for rotating an optical disc; an optical pickup for carrying out recording and/or reproduction of signals by irradiating with a light beam a signal recording surface of the optical disc rotated by the disc rotating means; a signal processing circuit for processing a detection signal from the optical pickup; and an access mechanism for moving the optical pickup in the direction of radius of the optical disc.

In this optical disc device, the optical pickup includes a light source for emitting the light beam, light beam converging means for converging the light beam emitted from the light source and for irradiating the signal recording surface of the optical disc with the converged light beam, a photodetector having a light-receiving section for receiving a return light beam reflected by the signal recording surface of the optical disc, an optical member arranged between the light source and photodetector on one side and the light beam converging means on the other side, for transmitting the light beam emitted from the light source and for transmitting the return light beam directed toward the photodetector, optical path branching means integrally formed with the optical member for separating the optical path of the light beam emitted from the light source and the optical path of the return light beam directed toward the photodetector, and a biaxial actuator for moving the light beam converging means into biaxial directions, that is, the direction of radius of the optical disc and the direction toward and away from the optical disc. The optical path branching means has at least two diffraction areas for diffracting the return light beam reflected by the signal recording surface of the optical disc, into different directions, respectively, and the boundary between the diffraction areas is inclined at a predetermined angle with respect to the direction corresponding to the direction of radius of the optical disc. At least one light-receiving section of the photodetector is divided into a portion for receiving a return light beam diffracted by one diffraction area of the optical path branching means and a portion for receiving a return light beam diffracted by the other diffraction area.

In the optical disc device according to the present invention, the optical disc as a recording medium is rotated by the disc rotating means. Then, when signals are to be recorded to and/or reproduced from the optical disc rotated by the disc rotating means, a light beam is first emitted from the light source of the optical pickup to the optical disc rotated by the disc rotating means. The optical pickup is moved in the direction of radius of the optical disc by the access mechanism so as to access a desired recording track.

The light beam emitted from the light source is transmitted through the optical member and directed toward the light beam converging means. The light beam is then converged by light beam converging means and then cast onto the signal recording surface of the optical disc.

In the case where the spot of the light beam cast on the signal recording surface of the optical disc is deviated from a predetermined recording track on the signal recording surface of the optical disc, or in the case where no focal point is formed on the signal recording surface of the optical disc, the biaxial actuator is driven on the basis of a tracking error signal or a focusing error signal from the signal processing circuit, and the light beam converging means is moved by the biaxial actuator into the direction of radius of the optical disc or into the direction toward and away from the optical disc. Thus, the spot of the light beam converged by the light beam converging means and cast onto the signal recording surface of the optical disc constantly follows a predetermined recording track on the signal recording surface of the optical disc and forms a focal point on the signal recording surface of the optical disc.

The light beam cast on the signal recording surface of the optical disc is reflected by the signal recording surface of the optical disc and thus becomes a return light beam including a signal component. The return light beam passes again through the light beam converging means and then becomes incident on the optical member.

The return light beam incident on the optical member has its optical path separated from the optical path of the light beam emitted from the light source, by the optical path branching means formed integrally with the optical member. Specifically, the optical path branching means includes, for example, a hologram formed on the surface of the optical member. As the return light beam is diffracted by the hologram into the direction toward the photodetector, the optical path of the return light beam is separated from the optical path of the light beam emitted from the light source.

Since the optical path branching means has at least two diffraction areas for diffracting the return light beam in different directions, the return light beams incident on the respective diffraction areas of the optical path branching means are diffracted into different directions by the diffraction areas of the optical path branching means, then transmitted through the optical member, and directed toward the photodetector.

Since at least one light receiving section of the photodetector is divided into the portion for receiving the return light beam diffracted by one diffraction area of the optical path branching means and the portion for receiving the return light beam diffracted by the other diffraction area, the return light beams diffracted into different directions by the respective diffraction areas of the optical path branching means are received by the corresponding portions of the light-receiving section of the photodetector.

The return light beams received by the respective portions of the light-receiving section of the photodetector are photoelectrically converted by the photodetector and supplied as detection signals to the signal processing circuit. In the signal processing circuit, predetermined arithmetic processing is carried out on the basis of the detection signal, thereby generating a reproduction signal and generating a focusing error signal by a so-called Foucault method.

Meanwhile, in the case where signals are to be recorded to and/or reproduced from the optical disc in this optical disc device, first the optical pickup is moved in the direction of radius by the access mechanism so as to access a desired recording track, as described above. In this case, the position of the light beam converging means of the optical pickup with respect to the optical member may be deviated into the direction of radius of the optical disc from the normal position because of inertia. When the position of the light beam converging means with respect to the optical member is deviated in the direction of radius of the optical disc from the normal position, the spot of the return light beam incident on the optical member is deviated in the direction corresponding to the direction of radius of the optical disc, on the optical path branching means.

In the optical disc device according to the present invention, the optical path branching means of the optical pickup has at least two diffraction areas for diffracting the return light beam into different directions, and the boundary between these diffraction areas is inclined at a predetermined angle with respect to the direction corresponding to the direction of radius of the optical disc. Therefore, in the case where the position of the light beam converging means is deviated in the direction of radius of the optical disc from the normal position, the return light beam is split asymmetrically by the optical path branching means. The individual parts of the return light beam generated by asymmetrical splitting by the optical path branching means are received by the corresponding portions of the light-receiving section of the photodetector. Therefore, the position deviation of the light beam converging means with respect to the optical member can be detected by carrying out predetermined arithmetic processing in the signal processing circuit on the basis of the detection signal from the light-receiving section of the photodetector.

According to the optical disc device of the present invention, since the position deviation of the light beam converging means with respect to the optical member at the time when causing the optical pickup to access a desired recording track on the optical disc can be detected in the above-described manner, the position of the light beam converging means can be instantaneously recovered to secure the accuracy and stability of the access operation and to realize the high-speed access property.

Also, in this optical disc device according to the present invention, the optical path branching means of the optical pickup for separating the optical path of the return light beam directed toward the photodetector from the optical path of the light beam emitted from the light source and for generating a focusing error signal by the Foucault method is used for detecting the position deviation of the light beam converging means with respect to the optical member, instead of additionally providing any means for detecting the position deviation of the light beam converging means. Therefore, the optical disc device can realize the high-speed access property by appropriately and simply detecting the position deviation of the light beam converging means, without causing the increase in the number of components, the increase in the size of the device itself and the rise in cost.

Another optical disc device according to the present invention includes: disc rotating means for rotating an optical disc; an optical pickup for carrying out recording and/or reproduction of signals by irradiating with a light beam a signal recording surface of the optical disc rotated by the disc rotating means; a signal processing circuit for processing a detection signal from the optical pickup; and an access mechanism for moving the optical pickup in the direction of radius of the optical disc.

In this optical disc device, the optical pickup includes a light source for emitting the light beam, light beam converging means for converging the light beam emitted from the light source and for irradiating the signal recording surface of the optical disc with the converged light beam, a photodetector having a light-receiving section for receiving a return light beam reflected by the signal recording surface of the optical disc, an optical member arranged between the light source and photodetector on one side and the light beam converging means on the other side, for transmitting the light beam emitted from the light source and for transmitting the return light beam directed toward the photodetector, optical path branching means integrally formed with the optical member for separating the optical path of the light beam emitted from the light source and the optical path of the return light beam reflected by the signal recording surface of the optical disc, return light beam splitting means integrally formed with the optical member for splitting the return light beam passed through the optical path branching means into at least two beams, and a biaxial actuator for moving the light beam converging means into biaxial directions, that is, the direction of radius of the optical disc and the direction toward and away from the optical disc. The return light beam splitting means has at least two surfaces having different normal vectors, and the boundary between these surfaces is inclined at a predetermined angle with respect to a direction corresponding to the direction of radius of the optical disc. At least one light-receiving section of the photodetector is divided into a portion for receiving one return light beam generated by the return light beam splitting means and a portion for receiving the other return light beam.

In this another optical disc device according to the present invention, the optical disc as a recording medium is rotated by the disc rotating means. Then, when signals are to be recorded to and/or reproduced from the optical disc rotated by the disc rotating means, a light beam is first emitted from the light source of the optical pickup to the optical disc rotated by the disc rotating means. The optical pickup is moved in the direction of radius of the optical disc by the access mechanism so as to access a desired recording track.

The light beam emitted from the light source is transmitted through the optical member and directed toward the light beam converging means. The light beam is then converged by light beam converging means and then cast onto the signal recording surface of the optical disc.

In the case where the spot of the light beam cast on the signal recording surface of the optical disc is deviated from a predetermined recording track on the signal recording surface of the optical disc, or in the case where no focal point is formed on the signal recording surface of the optical disc, the biaxial actuator is driven on the basis of a tracking error signal or a focusing error signal from the signal processing circuit, and the light beam converging means is moved by the biaxial actuator into the direction of radius of the optical disc or into the direction toward and away from the optical disc. Thus, the spot of the light beam converged by the light beam converging means and cast onto the signal recording surface of the optical disc constantly follows a predetermined recording track on the signal recording surface of the optical disc and forms a focal point on the signal recording surface of the optical disc.

The light beam cast on the signal recording surface of the optical disc is reflected by the signal recording surface of the optical disc and thus becomes a return light beam including a signal component. The return light beam passes again through the light beam converging means and then becomes incident on the optical member.

The return light beam incident on the optical member has its optical path separated from the optical path of the light beam emitted from the light source, by the optical path branching means formed integrally with the optical member. Specifically, the optical path branching means includes, for example, a hologram formed on the surface of the optical member. As the return light beam is diffracted by the hologram into the direction toward the photodetector, the optical path of the return light beam is separated from the optical path of the light beam emitted from the light source.

The return light beam having its optical path branched by the optical path branching means is then split into at least two beams by the return light beam splitting means integrally formed with the optical member.

Since the return light beam splitting means has at least two surfaces having different normal vectors, the return light beam incident on the return light beam splitting means is split along the boundary between the surfaces. The beams generated by splitting proceed in different directions in accordance with the normal vectors of the surfaces on which they are incident, and are directed toward the photodetector.

Since at least one light receiving section of the photodetector is divided into the portion for receiving one return light beam generated by the return light beam splitting means and the portion for receiving the other return light beam, the return light beams generated by the return light beam splitting means are received by the corresponding portions of the light-receiving section of the photodetector.

The return light beams received by the respective portions of the light-receiving section of the photodetector are photoelectrically converted by the photodetector and supplied as detection signals to the signal processing circuit. In the signal processing circuit, predetermined arithmetic processing is carried out on the basis of the detection signal, thereby generating a reproduction signal and generating a focusing error signal by a so-called Foucault method.

Meanwhile, in the case where signals are to be recorded to and/or reproduced from the optical disc in this optical disc device, first the optical pickup is moved in the direction of radius by the access mechanism so as to access a desired recording track, as described above. In this case, the position of the light beam converging means of the optical pickup with respect to the optical member may be deviated into the direction of radius of the optical disc from the normal position because of inertia. When the position of the light beam converging means with respect to the optical member is deviated in the direction of radius of the optical disc from the normal position, the spot of the return light beam incident on the optical member is deviated in the direction corresponding to the direction of radius of the optical disc, on the optical path branching means.

In this another optical disc device according to the present invention, the return light beam splitting means of the optical pickup has at least two surfaces of different normal vectors and the boundary between these surfaces is inclined at a predetermined angle with respect to the direction corresponding to the direction of radius of the optical disc. Therefore, in the case where the position of the light beam converging means is deviated in the direction of radius of the optical disc from the normal position, the return light beam is split asymmetrically by the return light beam splitting means. The individual parts of the return light beam generated by asymmetrical splitting by the return light beam splitting means are received by the corresponding portions of the light-receiving section of the photodetector. Therefore, the position deviation of the light beam converging means with respect to the optical member can be detected by carrying out predetermined arithmetic processing in the signal processing circuit on the basis of the detection signal from the light-receiving section of the photodetector.

According to this another optical disc device of the present invention, since the position deviation of the light beam converging means with respect to the optical member at the time when causing the optical pickup to access a desired recording track on the optical disc can be detected in the above-described manner, the position of the light beam converging means can be instantaneously recovered to secure the accuracy and stability of the access operation and to realize the high-speed access property.

Also, in this another optical disc device according to the present invention, the return light beam splitting means of the optical pickup for generating a focusing error signal by the Foucault method is used for detecting the position deviation of the light beam converging means with respect to the optical member, instead of additionally providing any means for detecting the position deviation of the light beam converging means. Therefore, the optical disc device can realize the high-speed access property by appropriately and simply detecting the position deviation of the light beam converging means, without causing the increase in the number of components, the increase in the size of the device itself and the rise in cost.

BRIEF DESCRIPTION OF THE DRAWINGS

FIG. 8A shows the state where the objective lens is located at a normal position. FIGS. 8B and 8C show the state where the position of the objective lens is deviated.

FIG. 12A shows the state where the objective lens is located at a normal position. FIGS. 12B and 12C show the state where the position of the objective lens is deviated.

BEST MODE FOR CARRYING OUT THE INVENTION

Preferred embodiments of the present invention will now be described in detail with reference to the drawings.

First Embodiment

Figure 1:
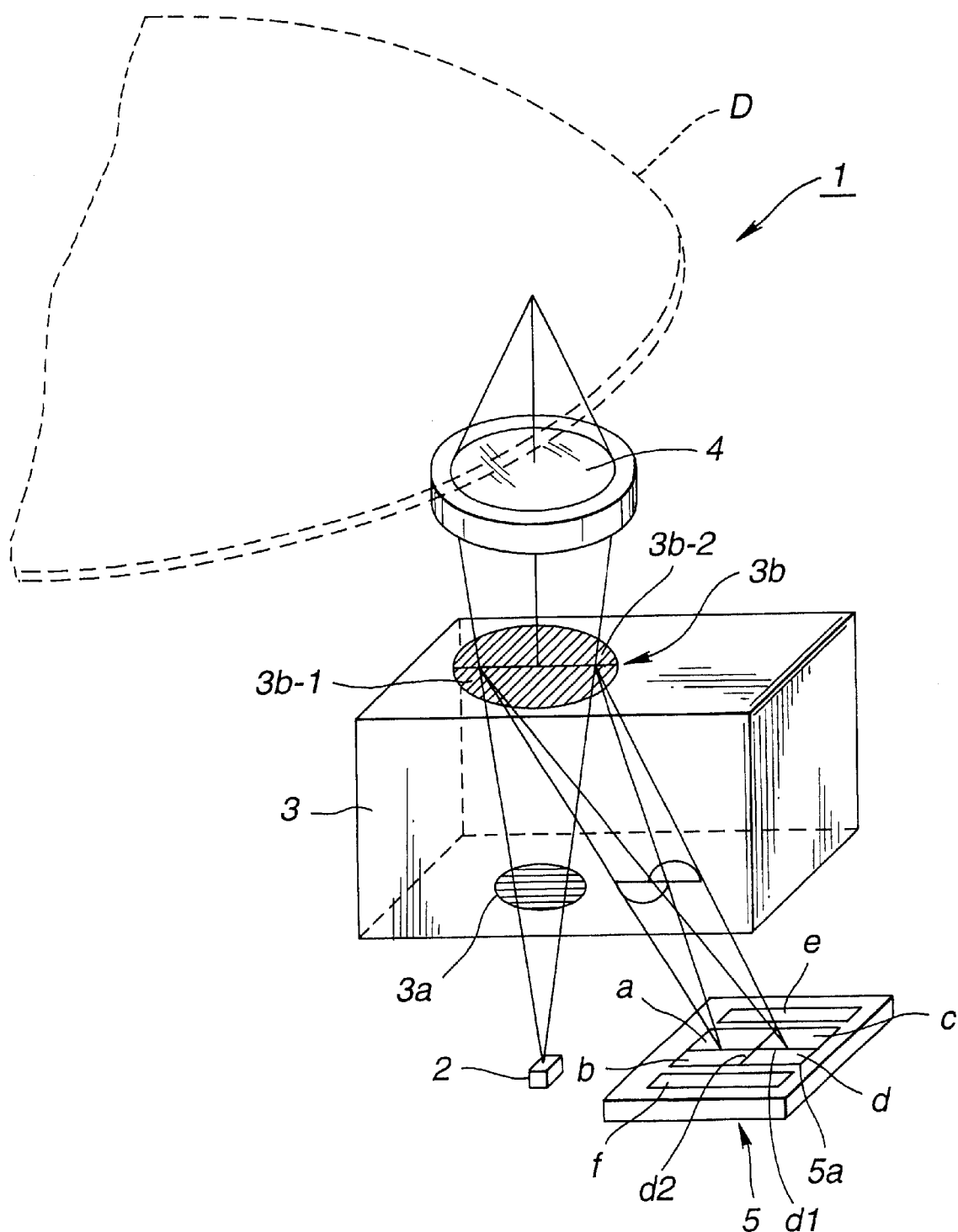
FIG. 1 is a perspective view schematically showing a conventional optical pickup.
Figure 2:
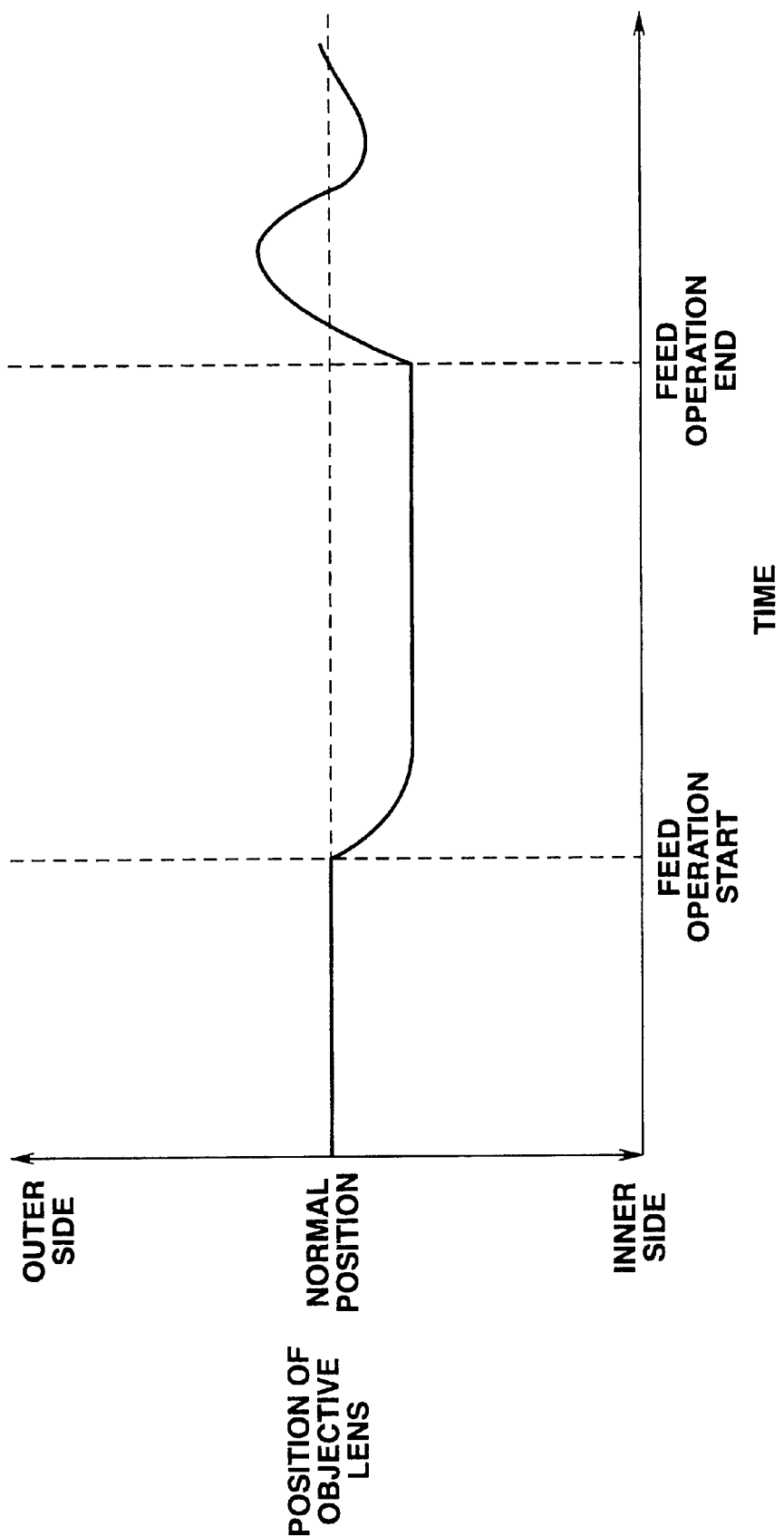
FIG. 2 is a view for explaining the deviation of an objective lens in the direction of radius of an optical disc at the time of access by the optical pickup.
Figure 3:
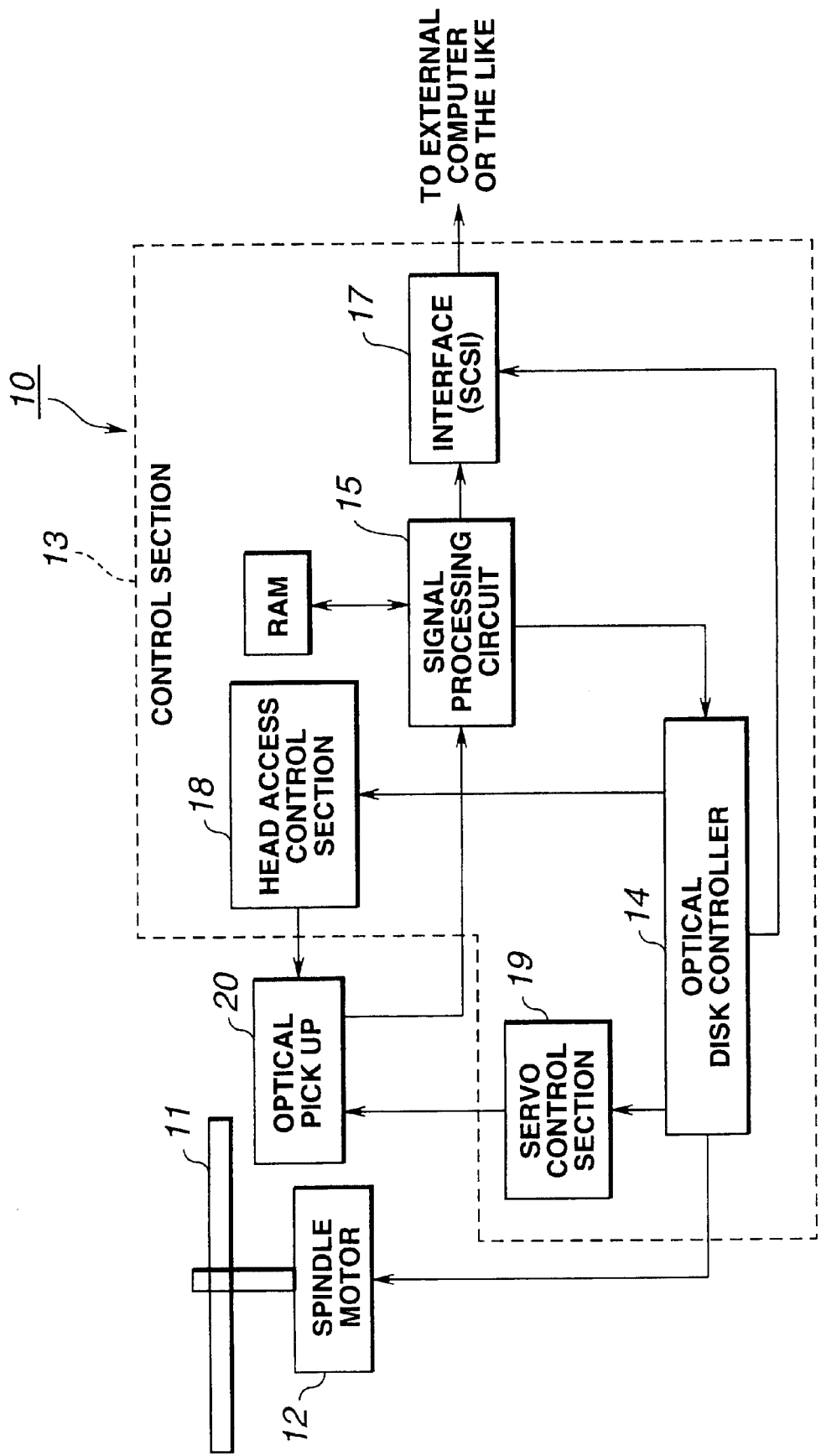
FIG. 3 is a block diagram showing an exemplary structure of an optical disc device to which the present invention is applied.

FIG. 3 shows the overall structure of an exemplary optical disc device to which the present invention is applied. This optical disc device 10 has a spindle motor 12 for rotationally driving an optical disc 11 as a recording medium, an optical pickup 20 for irradiating with a light beam the signal recording surface of the optical disc 11 rotationally driven by the spindle motor 12 and for receiving a return light beam reflected by the signal recording surface of the optical disc 11 so as to read record signals recorded on the signal recording surface of the optical disc 11, and a control section 13 for controlling the spindle motor 12 and the optical pickup 20, as shown in FIG. 3.

The control section 13 has an optical disc controller 14, a signal processing circuit 15, an interface 17, ahead access control section 18, and a servo control section 19.

The optical disc controller 14 controls the driving of the spindle motor 12 with a predetermined number of rotations, and controls the operation of each part inside the control section 13.

The signal processing circuit 15 generates a reproduction signal based on a detection signal from the optical pickup 20, and transmits the generated reproduction signal to an external computer or the like via the interface 17. This allows the external computer or the like to receive the signal recorded on the optical disc 11 as the reproduction signal. The signal processing circuit 15 also generates control signals such as a tracking error signal, a focusing error signal and a signal indicating the position information of an objective lens on the basis of the detection signal from the optical pickup 20, and supplies the generated signals to the optical disc controller 14.

The head access control section 18 moves the optical pickup 20 at a high speed into the direction of radius of the optical disc 11 under the control of the optical disc controller 14 so as to cause the optical pickup 20 to access a predetermined recording track on the signal recording surface of the optical disc 11, for example, by track jump or the like.

The servo control section 19 drives a biaxial actuator of the optical pickup 20 on the basis of the tracking error signal or focusing error signal under the control of the optical disc controller 14 so as to minutely move the objective lens held by the biaxial actuator into biaxial directions, that is, the direction of radius of the optical disc 11 (i.e., tracking direction) and the direction toward and away from the signal recording surface of the optical disc 11 (i.e., focusing direction), thus carrying out focusing servo and tracking servo.

The servo control section 19 also drives the biaxial actuator of the optical pickup 20 on the basis of the signal indicating the position information of the objective lens so as to minutely move the objective lens held by the biaxial actuator into the direction of radius of the optical disc 11, thus carrying out so-called midpoint servo for correcting the position deviation of the objective lens in the direction of radius of the optical disc at the time when the optical pickup is operated for access.

Figure 4:
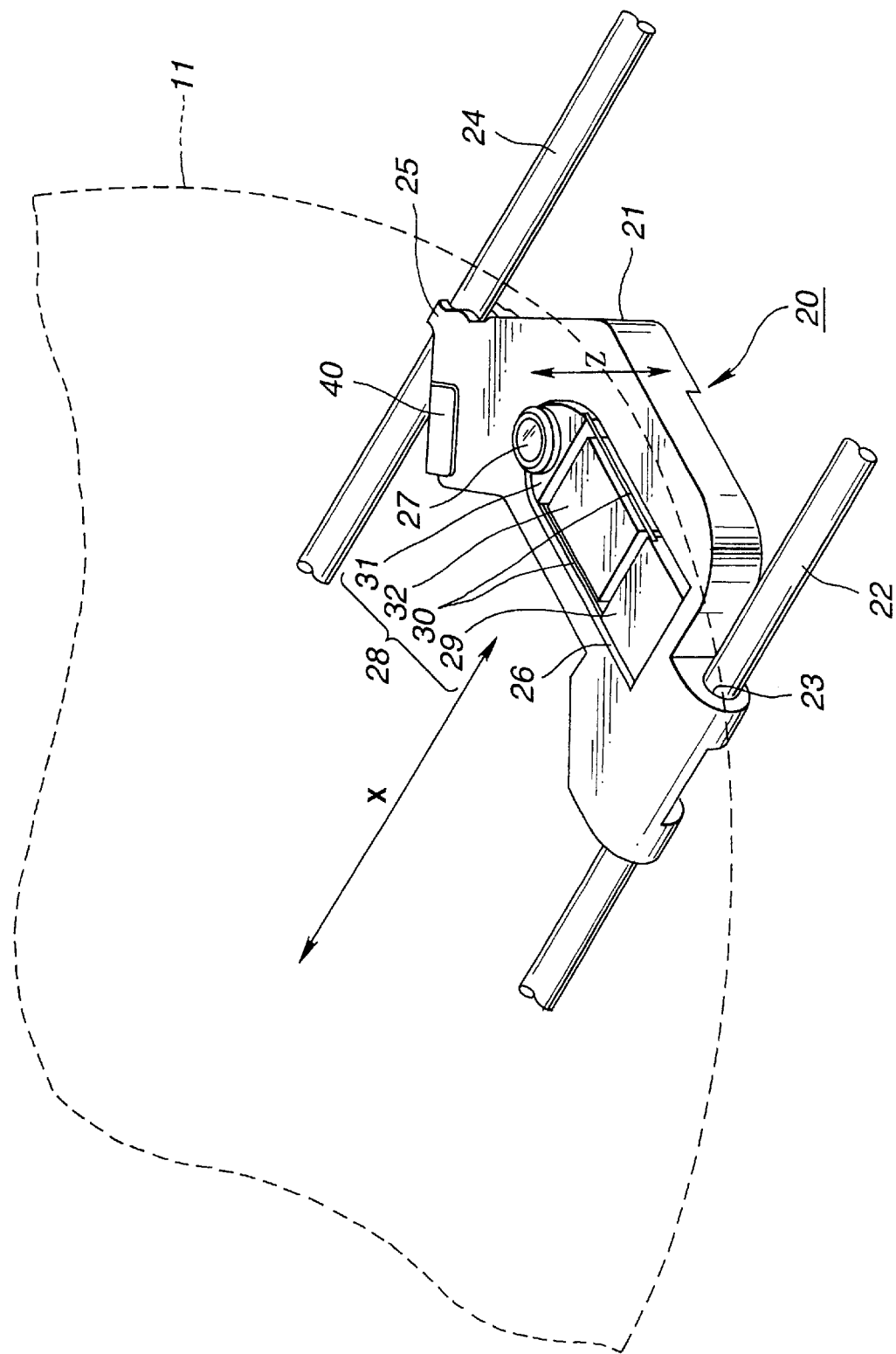
FIG. 4 is a perspective view schematically showing an optical pickup to which the present invention is applied.

The optical pickup 20 has a base 21 which is connected to a thread motor of the head access control section 18 via a thread feed shaft 22, as shown in FIG. 4.

The base 21 is made of a metal material such as aluminum or the like shaped in a plate-like form, and a through-hole 23 penetrating in the direction of width is provided at one end thereof. As the thread feed shaft 22 is inserted into the through-hole 23, the base 21 is connected to the thread motor of the head access control section 18 via the thread feed shaft 22 and is made movable in the direction of radius of the optical disc 11 indicated by an arrow X in FIG. 4 by the driving of the thread motor.

As the base 21 is moved in the direction of radius of the optical disc 11 by the driving of the thread motor of the head access control section 18, the optical pickup 20 can access a predetermined recording track on the signal recording surface of the optical disc 11.

At the other end of the base 21, an engagement piece 25 to be engaged with a guide shaft 24 of the optical disc device 10 is provided. As the engagement piece 25 is engaged with the guide shaft 24, the base 21 can maintain its attitude and be stably moved by the driving of the thread motor.

On the base 21, a biaxial actuator housing section 26 is provided which opens in a main surface section facing the optical disc 11. Inside the biaxial actuator housing section 26, a biaxial actuator 28 is housed which is adapted for minutely moving an objective lens 27 into the direction of radius of the optical disc 11 indicated by an arrow X in FIG. 4 and into the direction toward and away from the signal recording surface of the optical disc 11 indicated by an arrow Z in FIG. 4.

The biaxial actuator 28 has a fixed portion 29 fixed to the base 21, a lens holding portion 31 movably supported to the fixed portion 29 via a suspension 30, and a driving portion 32 having a coil and a magnet for minutely moving the lens holding portion 31 in biaxial directions by an electromagnetic force. The objective lens 27 is held by the lens holding portion 31 of the biaxial actuator 28.

In this biaxial actuator 28, when a current based on a tracking error signal and a focusing error signal is supplied to the coil of the driving portion 32 from the servo control section 19, the driving portion 32 generates an electromagnetic force to minutely move the lens holding portion 31 in the biaxial directions in accordance with the value of the current supplied thereto. Thus, the objective lens 27 held by the lens holding portion 31 is minutely moved in the biaxial directions, that is, in the direction of radius of the optical disc 11 and in the direction toward and away from the optical disc 11, in accordance with the tracking error signal and the focusing error signal.

At the other end of the base 21, an integrated optical element 40 is mounted which is formed as a one chip including a semiconductor laser element as a light source and a photodetector integrated therein.

Figure 5:
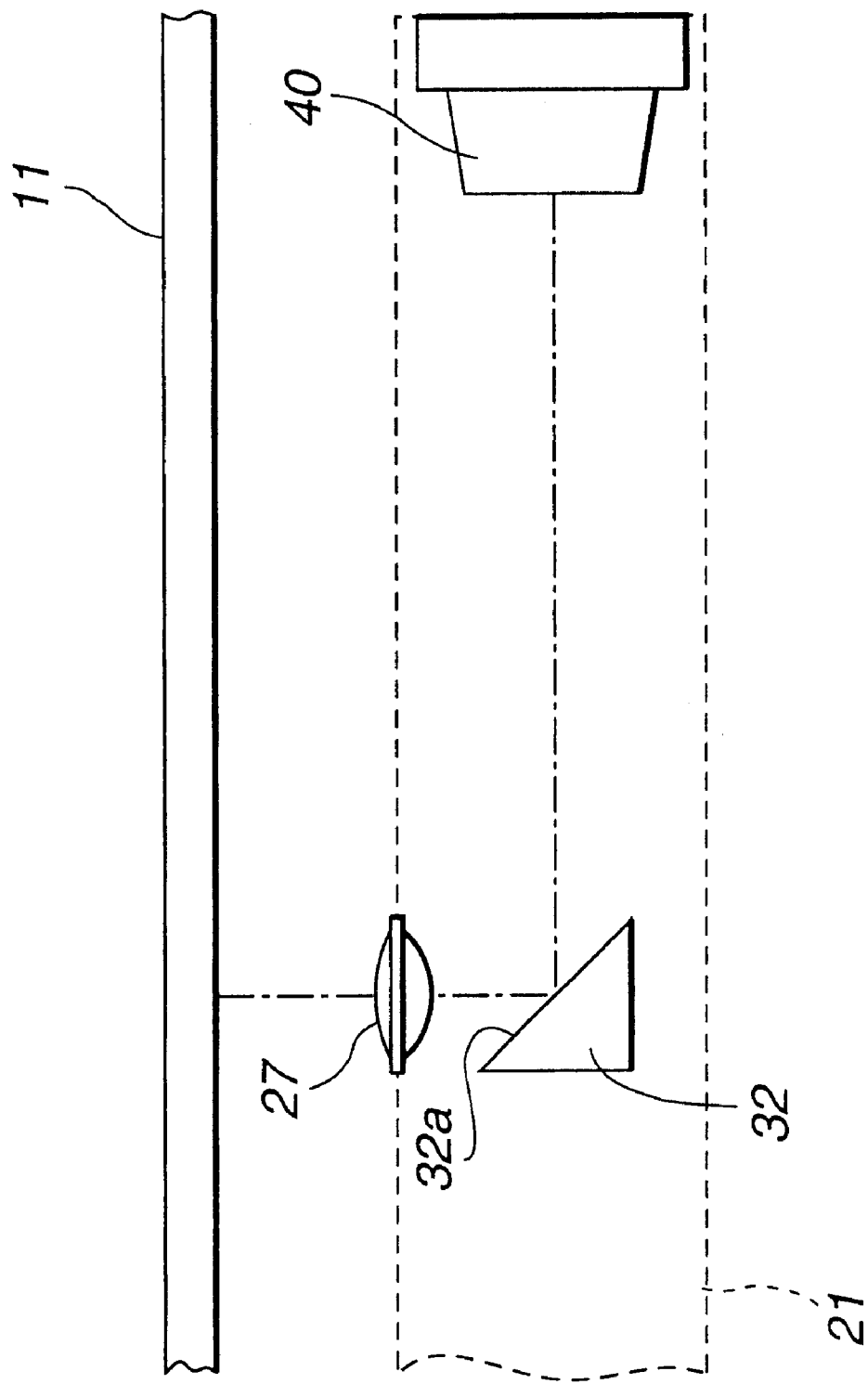
FIG. 5 is a side view schematically showing the state inside the optical pickup for explaining the positional relation of an integrated optical element to which the present invention is applied in the optical pickup.

In this optical pickup 20, the integrated optical element 40 is mounted on the base 21 so that a light beam is emitted in a direction substantially parallel to the main surface portion of the base 21, that is, substantially parallel to the signal recording surface of the optical disc 11, as shown in FIG. 5. In this optical pickup 20, a light beam emitted from the integrated optical element 40 is reflected by a reflection surface 32a of a rise mirror 32, thereby bending the optical path by approximately 90 degrees to leading the optical path to the objective lens 27.

As the light beam emitted from the integrated optical element 40 is caused to proceed substantially in parallel to the signal recording surface of the optical disc 11, the optical pickup 20 can be reduced in thickness while an optical path length necessary for the light beam is secured.

Figure 6:
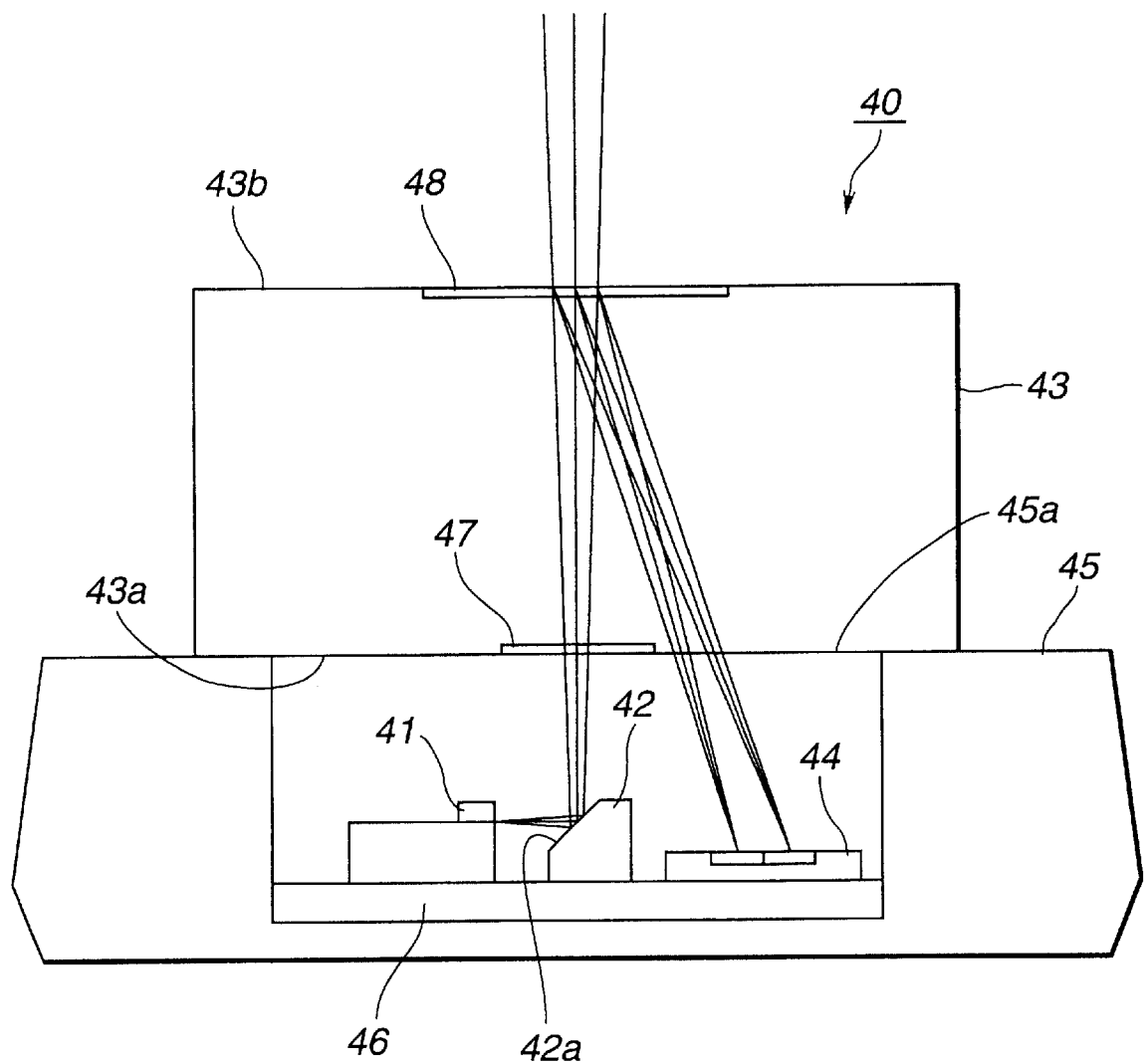
FIG. 6 is a side view schematically showing the state inside the integrated optical element to which the present invention is applied.

The integrated optical element 40 has a semiconductor laser element 41 as a light source, a prism 42 having a function to bend the optical path of the light beam emitted from the semiconductor laser element 41, an optical member 43 made of a transparent material for transmitting the laser beam with its optical path bent by the prism 42 and for transmitting a return light beam reflected by the signal recording surface of the optical disc 11, and a photodetector IC 44 as a photodetector for receiving the return light beam, as shown in FIG. 6.

The semiconductor laser element 41, the prism 42 and the photodetector IC 44 are provided on a board 46 arranged inside a package member 45. On one main surface portion of the package member 45, an aperture 45a is provided. On the main surface portion of the package member 45 where the aperture 45a is provided, the optical member 43 is joined by an adhesive or the like so as to close the aperture 45a. That is, the integrated optical element 40 is constituted as one element including the individual members integrated therein. This integrated optical element 40 is mounted on the base 21 of the above-described optical pickup 20 and is held in a fixed state thereon.

The semiconductor laser element 41 is a light-emitting element utilizing recombination radiation of the semiconductor, and emits a laser beam (light beam) to be cast onto the signal recording surface of the optical disc 11.

The prism 42 has an inclined surface 42a inclined at an inclination of approximately 45 degrees with respect to the board 46. This inclined surface 42a reflects the light beam emitted from the semiconductor laser element 41 into the direction substantially parallel to the board 46 and bends the optical path of the light beam.

The optical member 43 is formed in a parallel-plate shape made of a transparent plastic material or glass and having a first surface 43a and a second surface 43b which are parallel to each other. This optical member 43 is joined onto the package member 45 so as to close the aperture 45a of the package member 45 by the first surface 43a.

On the first surface 43a of the optical member 43, a grating 47 as light beam splitting means is integrally formed at a position on the optical path of the light beam which is reflected by the prism 42 and incident on the optical member 43.

This grating 47 is a diffraction grating for diffracting the light incident thereon, and has a plurality of grooves extending in a direction slightly inclined with respect to the direction corresponding to the direction of radius of the optical disc 11. The grating 47 has a function to split the light beam incident on the optical member 43 into a plurality of beams including at least a main beam made up of a 0th-order diffracted light and two side beams made up of plus and minus 1st-order diffracted lights by the diffraction effect of these grooves.

Of the plurality of beams generated by splitting by the grating 47, the main beam is cast onto a predetermined recording track on the signal recording surface of the optical disc 11. Of the plurality of beams generated by splitting by the grating 47, the two side beams are cast to positions which are vertically away from the position irradiated with the main beam along the recording track and which are horizontally away from the center of the recording track by approximately ¼ track on the signal recording surface of the optical disc 11. Thus, three light spots are formed on the signal recording surface of the optical disc 11. Therefore, the optical pickup 20 is capable of detecting a tracking error signal by a so-called three-beam method.

The size of the grating 47 is set so that a return light beam which is reflected by the signal recording surface of the optical disc 11, then passed through the objective lens and incident again on the optical member 43 and which is diffracted by a hologram 48, later described, and directed toward the photodetector IC 44 does not become incident.

On the second surface 43b of the optical member 43, the hologram 48 as optical path branching means is integrally formed at a position on the optical path of the return light beam which is reflected by the signal recording surface of the optical disc 11, then passed through the objective lens 27 and incident again on the optical member 43.

This hologram 48 directly transmits the light beam incident on the optical member 43 from the first surface 43a, that is, the light beam directed toward the optical disc 11, and diffracts the light beam incident on the optical member 43 from the second surface 43b, that is, the return light beam reflected by the signal recording surface of the optical disc 11, into the direction toward the photodetector IC 44.

As the return light beam reflected by the signal recording surface of the optical disc 11 is diffracted by the hologram 48 into the direction toward the photodetector IC 44, the optical path of the return light beam is separated from the optical path of the light beam incident on the optical member 43 from the first surface 43a.

Figure 7:
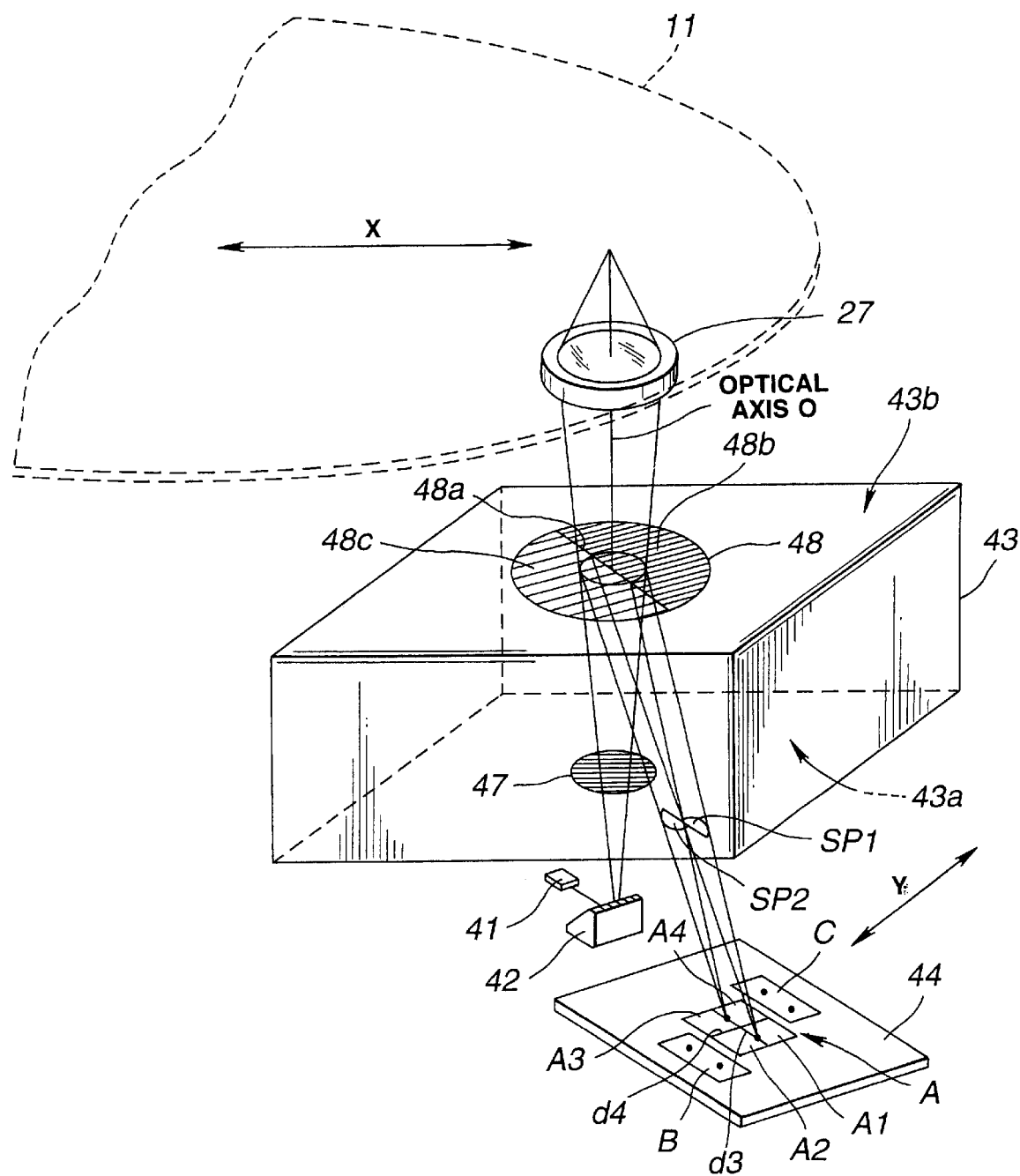
FIG. 7 is a perspective view schematically showing the positional relation of individual members constituting the optical pickup to which the present invention is applied.

This hologram 48 has two hologram areas 48b and 48c which are formed by bisecting along a boundary 48a passing through the optical axis O of the return light beam of the main beam and in which holographic gratings of different main diffraction angles are formed, respectively, as shown in FIG. 7. The holographic gratings of the hologram areas 48b and 48c are constituted by a plurality of grooves extending in a substantially perpendicular direction with respect to the boundary 48a. Therefore, the return light beam incident on the hologram 48 is split into two beams by the boundary 48a of the hologram 48, and a portion incident on the one hologram area 48b and a portion incident on the other hologram area 48c are diffracted at different diffraction angles into the direction along the boundary 48a. The diffracted beams are directed to different positions on the photodetector IC 44 as beams forming substantially semi-circular spots as indicated by spots SP1 and SP2 in FIG. 7. In FIG. 7, only the main beam is shown.

In the optical pickup 20, as the individual portions of the return light beam generated by splitting by the boundary 48a of the hologram 48 and directed toward different positions on the photodetector IC 44 are received by the corresponding portions of the light-receiving section of the photodetector IC 44, a focusing error signal can be detected by the so-called Foucault method.

In the hologram 48, the boundary 48a between the two hologram areas 48b and 48c is inclined at a predetermined inclination with respect to the direction corresponding to the direction of radius of the optical disc 11 so that the boundary does not coincide with the direction corresponding to the direction of radius of the optical disc 11 indicated by an arrow X in FIG. 7. Specifically, the boundary 48a between the two hologram areas 48b and 48c of the hologram 48 is inclined at approximately 45 degrees with respect to the direction corresponding to the direction of radius of the optical disc 11.

In this case, the direction corresponding to the direction of radius of the optical disc 11 is a direction substantially equivalent to the direction of radius of the optical disc 11 with respect to the return light beam incident on the hologram 48, and is a direction in which the return light beam incident on the hologram 48 moves when the spot of the light beam cast onto the signal recording surface of the optical disc 11 moves in the direction of radius of the optical disc 11.

In FIG. 7, to simplify the description, the rise mirror 32 is not shown which is arranged between the integrated optical element 40 and the objective lens 27 so that the direction corresponding to the direction of radius of the optical disc 11 is the same as the direction of radius of the optical disc 11. In FIG. 7, the semiconductor element 41, the prism 42, the optical member 43 and the photodetector IC 44 are shown as separate members. Actually, however, these respective optical elements are integrated as the integrated optical element 40, as described above.

As described above, in the case where the boundary 48a between the two hologram areas 48b and 48c of the hologram 48 is not coincident with the direction corresponding to the direction of radius of the optical disc 11, when the position of the objective lens 27 with respect to the optical member 43, that is, the position of the objective lens 27 with respect to the integrated optical element 40 and the base 21 of the optical pickup 20 holding the integrated optical element, is deviated into the direction of radius of the optical disc 11 from the normal position, the return light beam passed through the objective lens 27 and incident on the hologram 48 is asymmetrically split by the boundary 48a between the two hologram areas 48b and 48c of the hologram 48. The respective parts of the return light beam generated by the asymmetrical splitting are received by the corresponding portions of the light-receiving section of the photodetector IC 44.

Thus, in the optical pickup 20, the position deviation of the objective lens 27 in the direction of radius of the optical disc 11 can be detected by finding the difference in the light quantity of the respective parts of the return light be am received by the corresponding portions of the light-receiving section of the photodetector IC 44.

In the above description, the boundary 48a between the two hologram areas 48b and 48c of the hologram 48 is inclined at approximately 45 degrees with respect to the direction corresponding to the direction of radius of the optical disc 11. However, the angle of inclination of the boundary 48a with respect to the direction corresponding to the direction of radius of the optical disc 11 may be suitably set within such a range that a sensitivity necessary for detecting the position deviation of the objective lens 27 in the direction of radius of the optical disc 11 can be obtained.

The range which allows obtaining the sensitivity necessary for detecting the position deviation of the objective lens 27 in the direction of radius of the optical disc 11 is more or less dependent on the performance of the individual members constituting the optical pickup 20. In general, as long as the boundary 48a is inclined at 15 degrees or more with respect to the direction corresponding to the direction of radius of the optical disc 11, the sensitivity necessary for detecting the position deviation of the objective lens 27 in the direction of radius of the optical disc 11 can be obtained satisfactorily.

Therefore, it is desired that the boundary 48a between the two hologram areas 48b and 48c of the hologram 48 is inclined at 15 degrees or more with respect to the direction corresponding to the direction of radius of the optical disc 11.

The photodetector IC 44 has a photodetector section for receiving the return light beam diffracted by the hologram 48 and transmitted through the optical member 43, and a voltage conversion circuit for converting a current from the photodetector section to a voltage. These section and circuit are integrated as one element.

The photodetector section of the photodetector IC 44 has, as shown in FIG. 7, a center light-receiving section A, and two light-receiving sections B and C arranged at positions slightly distanced from the light-receiving section A into the direction corresponding to the direction along the recording track on the optical disc 11, as indicated by an arrow Y in FIG. 7.

The direction corresponding to the direction along the recording track on the optical disc 11 is a direction substantially equivalent to the direction along the recording track on the optical disc 11 with respect to the return light beam incident on the photodetector section of the photodetector IC 44. It is the direction in which the return light beam incident on the photodetector section moves when the spot of the light beam cast on the signal recording surface of the optical disc 11 moves along the recording track on the optical disc 11.

Of these light-receiving sections of the photodetector section, the center light-receiving section A is divided by division lines which are parallel to the boundary 48a between the two hologram areas 48b and 48c of the hologram 48, that is, a division line d3 inclined at approximately 45 degrees with respect to the direction corresponding to the direction of radius of the optical disc 11 and a division line d4 orthogonal to the division line d3, and thus has four light-receiving sections A1, A2, A3 and A4.

In the photodetector section of the photodetector IC 44, the light-receiving section B and the light-receiving section C of these light-receiving sections receive the return light beams of the two side beams generated by splitting by the grating 47. Also, in the photodetector section of the photodetector IC 44, the light-receiving sections A1 and A2 on one side of the division line d4 of the center light-receiving section A receive the part of the return light beam of the main beam which is diffracted by one hologram area 48b of the hologram 48, and the light-receiving sections A3 and A4 on the other side of the division line d4 of the center light-receiving section A receive the part of the return light beam of the main beam which is diffracted by the other hologram area 48c of the hologram 48.

The light-receiving sections A1 and A2 for receiving the return light diffracted by one hologram area 48b of the hologram 48, and the light-receiving sections A3 and A4 for receiving the return light diffracted by the other hologram area 48c of the hologram 48 are divided by the division line d3 which is parallel to the boundary 48a between the two hologram areas 48b and 48c of the hologram 48.

In this optical pickup 20, as described above, the respective parts of the return light beam of the main beam generated by splitting by the hologram 48 are received by the two light-receiving sections separated by the division line d3 which is parallel to the boundary 48a of the hologram 48. Therefore, for example, even when the position on the photodetector IC 44 of the return light beam spot of the light beam in the focused state is slightly changed in the case where a change of the oscillation wavelength is generated in the semiconductor laser element 41 or in the case where a change in the refractive index is generated in the optical member 43 because of a temperature change, it is possible to effectively restrain generation of any deviation of the signal level of a focusing error signal due to the position change of the return light beam spot, and to detect an appropriate focusing error signal.

In the photodetector IC 44, the current values based on the light quantities of the return lights received by the light-receiving sections A1, A2, A3, A4, B and C of the photodetector section are converted to voltage values by the voltage conversion circuit and are supplied as light-receiving signals to the signal processing circuit 15 of the optical disc device 10. Then, the signal processing circuit 15 carries out predetermined arithmetic processing based on the light-receiving signals, thereby generating a reproduction signal RF1. Also, a focusing error signal FE1 is generated by the so-called Foucault method and a tracking error signal TR1 is generated by the so-called three-beam method. Moreover, a signal indicating the position information of the objective lens 27 is generated.

The operation for reproducing the signals recorded on the optical disc 11 by using the optical disc device 10 constituted as described above will now be described.

In reproducing the signals recorded on the optical disc 11 by using the optical disc device 10, first, the optical disc 11 is mounted on the spindle motor 12. Then, as the spindle motor 12 is rotationally driven at a predetermined number of rotations under the control of the optical disc controller 14, the optical disc 11 is rotated.

A light beam is emitted from the semiconductor laser element 41 provided in the integrated optical element 40 of the optical pickup 20. Then, as the thread motor of the head access control section 18 is driven under the control of the optical disc controller 14, the optical pickup 20 is moved at a high speed in the direction of radius of the optical disc 11 so as to access a predetermined recording track on the signal recording surface of the optical disc 11.

The light beam emitted from the semiconductor laser element 41 is reflected by the inclined surface 42a of the prism 42 and becomes incident on the optical member 43 from its first surface 43a via the aperture 45a of the package member 45. The light beam incident on the optical member 43 is split into a plurality of beams including a main beam and two side beams by the grating 47 provided on the first surface 43a of the optical member 43, then transmitted through the optical member 43, and emitted from the integrated optical element 40.

The light beam emitted from the integrated optical element 40 is reflected by the reflection surface 32a of the rise mirror 32 and becomes incident on the objective lens 27. The light beam incident on the objective lens 27 is converged by the objective lens 27 and then cast onto the predetermined recording track on the signal recording surface of the optical disc 11. In this case, three beam spots are formed on the signal recording surface of the optical disc 11 by the main beam and two side beams generated by splitting by the grating 47.

The light beam cast onto the signal recording surface of the optical disc 11 is reflected by the signal recording surface of the optical disc 11 so as to be a return light beam including a signal component, which is transmitted again through the objective lens 27 and becomes incident on the optical member 43 from its second surface 43b.

The return light beam incident on the optical member 43 from its second surface 43b is diffracted by the hologram 48 formed on the second surface 43b of the optical member 43, and the optical path of this return light beam is thus separated from the optical path of the light beam incident on the optical member 43 from its first surface 43a.

In this case, the return light beam is split into two parts by the boundary 48a of the hologram 48. The part incident on one hologram area 48b and the part incident on the other hologram area 48c are diffracted at different diffraction angles in the direction along the boundary 48a and are directed toward different positions on the photodetector IC 44.

The return light beams, diffracted by the hologram 48 and transmitted through the optical member 43, become incident on the package member 45 via the aperture 45a of the package member 45, then reach the photodetector IC 44, and are received respectively by the light-receiving sections A1, A2, A3, A4, B and C of the photodetector section of the photodetector IC 44.

Of the return light beams having reached the photodetector IC 44, return light beams of the two side beams generated by splitting by the grating 47 are received respectively by the light-receiving section B and the light-receiving section C of the photodetector section.

Of the return light beams having reached the photodetector IC 44, a return light beam of the main beam which is diffracted by one hologram area 48b of the hologram 48 is received by the light-receiving sections A1 and A2 on one side of the division line d4 of the light-receiving section A. Of the return light beams having reached the photodetector IC 44, a return light beam of the main beam which is diffracted by the other hologram area 48c of the hologram 48 is received by the light-receiving sections A3 and A4 on the other side of the division line d4 of the light-receiving section A.

The return light beams received by the respective light-receiving sections A1, A2, A3, A4, B and C of the photodetector section are detected as current values based on the light quantities by these light-receiving sections A1, A2, A3, A4, B and C. The current values based on the light quantities of the return light beams are converted to voltage values by the voltage conversion circuit and are supplied as light-receiving signals to the signal processing circuit 15.

Then, the signal processing circuit 15 carries out predetermined arithmetic processing based on the light-receiving signals, thereby generating a reproduction signal RF1. Also, a focusing error signal FE1 is generated by the so-called Foucault method and a tracking error signal TR1 is generated by the so-called three-beam method.

In the optical disc device 10 to which the present invention is applied, as the signal processing circuit 15 carries out predetermined arithmetic processing based on the light-receiving signals, a signal S1 indicating the position information of the objective lens is generated.

The reproduction signal RF1 is found by the signal processing circuit 15 carrying out arithmetic processing with respect to the following equation (6), where SA1, SA2, SA3 and SA4 represent the light-receiving signals based on the return light beam of the main beam received by the light-receiving sections A1, A2, A3 and A4 of the photodetector section of the photodetector IC 44.

$$RF1 = (SA1+SA2)+(SA3+SA4) \quad (6)$$

The reproduction signal RF1 generated by the signal processing circuit 15 is processed by error correction and then transmitted to an external computer or the like via the interface 17. Thus, the external computer or the like can receive the signal recorded on the optical disc 11 as the reproduction signal.

The focusing error signal FE1 is found by the signal processing circuit 15 carrying out arithmetic processing with respect to the following equations (7), (8) or (9), where SA1, SA2, SA3 and SA4 represent the light-receiving signals based on the return light beam of the main beam received by the light-receiving sections A1, A2, A3 and A4 of the photodetector section of the photodetector IC 44.

$$FE1 = SA1 - SA2 \quad (7)$$

$$FE1 = SA3 - SA4 \quad (8)$$

$$FE1 = (SA1+SA3) - (SA2+SA4) \quad (9)$$

The tracking error signal TR1 is found by the signal processing circuit 15 carrying out arithmetic processing with respect to the following equation (10), where SB and SC represent the light-receiving signals based on the return light beams of the two side beams received by the light-receiving sections B and C of the photodetector section of the photodetector IC 44.

$$TR1 = SB - SC \quad (10)$$

The focusing error signal FE1 and the tracking error signal TR1 generated by the signal processing circuit 15 are supplied to the servo control section 19 via the optical disc controller 14.

On the basis of the focusing error signal FE1 and the tracking error signal TR1, the servo control section 19 drives the biaxial actuator 28 of the optical pickup 20 under the control of the optical disc controller 14.

As the biaxial actuator 28 is driven by the servo control section 19 in accordance with the focusing error signal FE1 and the tracking error signal TR1, the biaxial actuator 28 carries out focusing servo to minutely move the objective lens 27 held by the lens holding section 31 into the direction toward and away from the signal recording surface of the optical disc 11, thus controlling the focal point of the light beam converged by the objective lens 27 so as to be constantly located on the signal recording surface of the optical disc 11. The biaxial actuator 28 also carries out tracking servo to minutely move the objective lens 27 held by the lens holding section 31 into the direction of radius of the optical disc 11, thus controlling the spot of the light beam converged by the objective lens 27 so as to follow the recording track on the optical disc 11.

By thus reading the reproduction signal while carrying out the focusing servo and tracking servo, the optical disc device 10 can appropriately reproduce the signals recorded on the optical disc 11 even in the case where the optical disc 11 is fluctuated or tilted.

Meanwhile, in the case where the signals recorded on the optical disc 11 are to be reproduced by this optical disc device 10, first the optical pickup 20 is moved at a high speed into the direction of radius of the optical disc 11 mounted on the spindle motor 12 so as to access a predetermined recording track on the signal recording surface of the optical disc 11, as described above. In this case, the tracking servo is off.

The objective lens 27 of the optical pickup 20 is held by the lens holding section 31 movably supported to the fixed portion 29 of the biaxial actuator 28 via the suspension 30, as described above. Therefore, when the optical pickup 20 is moved at a high speed into the direction of radius of the optical disc 11, or when this movement is stopped, the position of the objective lens 27 with respect to the fixed portion 29, that is, the position of the objective lens 27 with respect to the base 21 of the optical pickup 20 and the portion fixed thereto is deviated into the direction of radius of the optical disc 11 from the normal position, under the influence of inertia.

In the state where the objective lens 27 is deviated from the normal position in this manner, appropriate recording/reproduction of signals to/from the optical disc 11 cannot be carried out. The deviation of the objective lens 27 from the normal position is eliminated with the lapse of a predetermined time period. However, if recording/reproduction is carried out after the elimination of the deviation of the objective lens 27, a relatively long time is required until the recording/reproduction of signals to/from a predetermined recording track on the optical disc 11 is started, thus substantially obstructing the high-speed access property.

Thus, in the optical disc device 10 to which the present invention is applied, the position of the objective lens 27 is instantaneously recovered to realize the high-speed access property, by detecting the deviation of the objective lens 27 from the normal position as position information, then causing the servo control section 19 to drive the biaxial actuator 28 of the optical pickup 20 on the basis of the position information of the objective lens 27, and then carrying out so-called midpoint servo for correcting the position deviation of the objective lens 27.

Figure 8A:
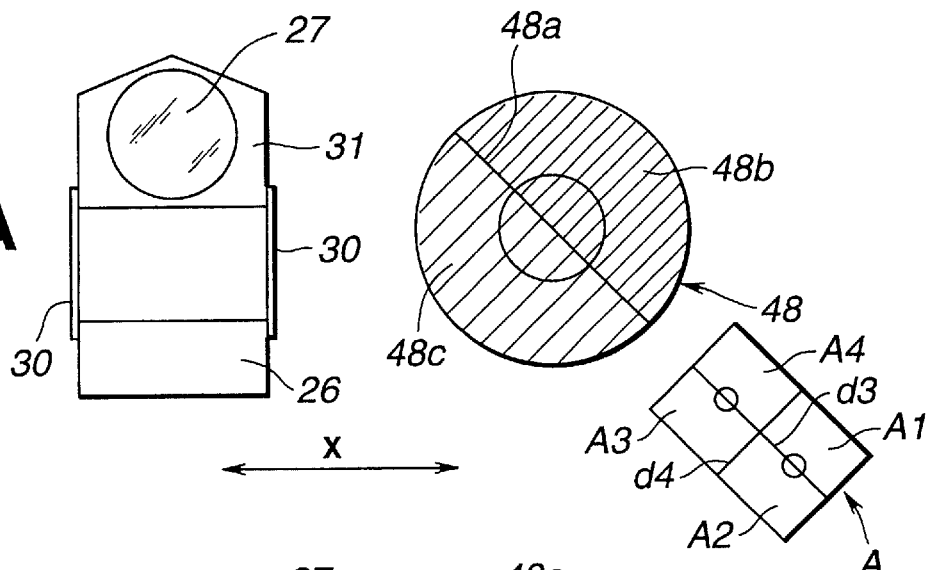
FIGS. 8A to 8C show the relation between the position of an objective lens in the optical pickup to which the present invention is applied and the position of a return light spot formed on a hologram.
Figure 8B:
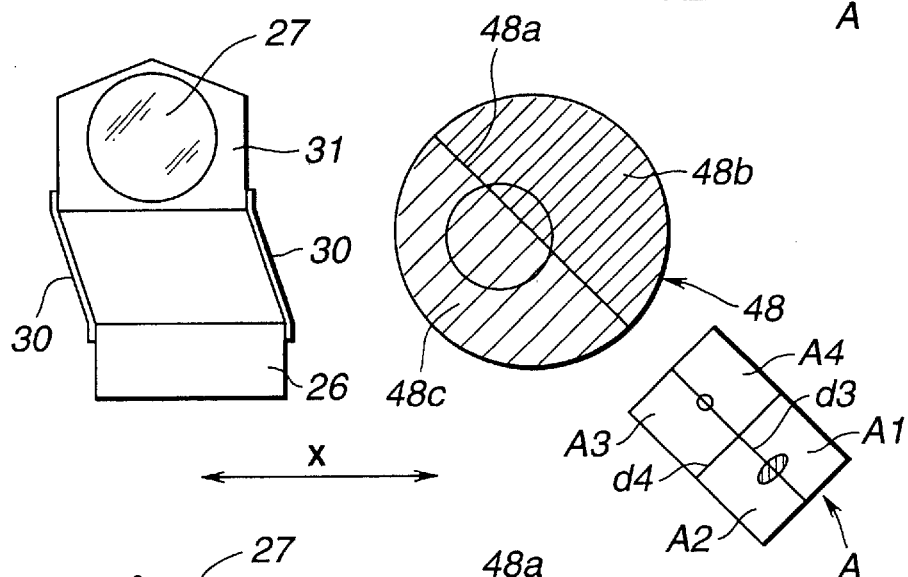
Figure 8C:
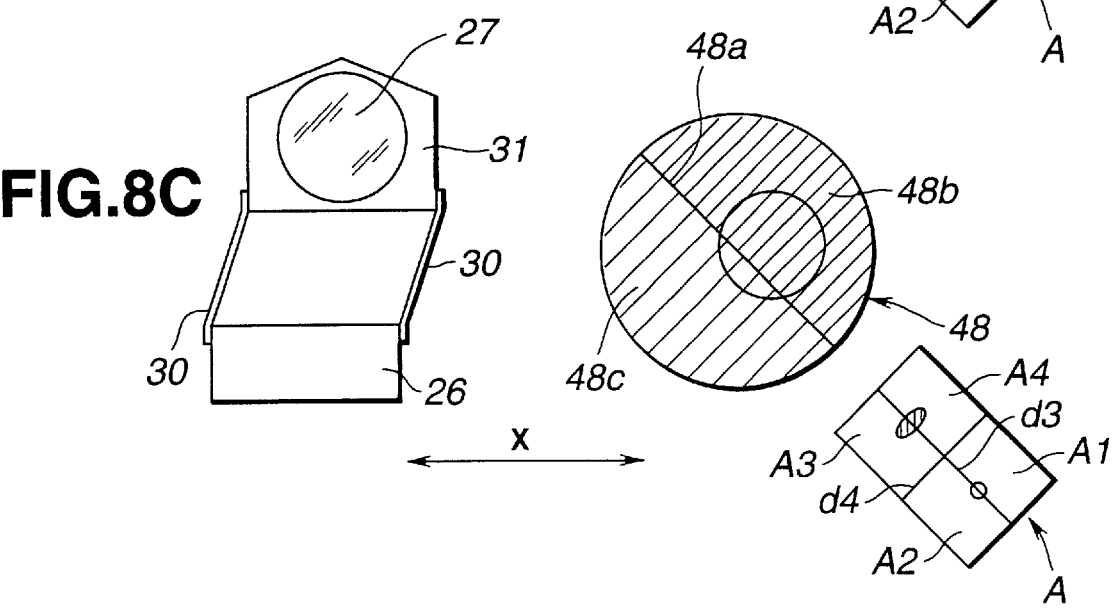

In the optical disc device 10 to which the present invention is applied, when the position of the objective lens 27 with respect to the base 21 of the optical pickup 20 and the portion fixed thereto is deviated from the normal position indicated in FIG. 8A into the direction of radius of the optical disc 11 indicated by an arrow X in FIGS. 8B and 8C, the spot of the return light beam incident on the optical member 43 of the integrated optical element 40 from the second surface 43b is deviated on the hologram 48 into the direction corresponding to the direction of radius of the optical disc 11.

When the objective lens 27 is at the normal position, the hologram 48 is divided into the two hologram areas 48b and 48c by the boundary 48a passing through the optical axis O of the return light beam of the main beam incident on the optical member 43, and the boundary 48a between the two hologram areas 48b and 48c is inclined at a predetermined angle so as not to coincide with the direction corresponding to the direction of radius of the optical disc 11.

Thus, when the position of the objective lens 27 with respect to the base 21 of the optical pickup 20 and the portion fixed thereto is deviated into the direction of radius of the optical disc 11 from the normal position, the return light beam of the main beam incident on the hologram 48 is asymmetrically split by the boundary 48a between the two hologram areas 48b and 48c of the hologram 48.

Specifically, when the objective lens 27 is at the normal position, the return light beam of the main beam becomes uniformly incident on the two hologram areas 48b and 48c of the hologram 48 and split into two parts substantially uniformly by the boundary 48a between the two hologram areas, as shown in FIG. 8A.

On the other hand, when the position of the objective lens 27 is deviated into the direction of radius of the optical disc 11, the part of the return light beam of the main beam which is incident on one hologram area 48b of the hologram 48 is smaller than the part incident on the other hologram area 48c, as shown in FIG. 8B, or the part of the return light beam of the main beam which is incident on the other hologram area 48c of the hologram 48 is smaller than the part incident on the one hologram area 48b, as shown in FIG. 8C. Thus, the return light beam of the main beam is asymmetrically split by the boundary 48a between the two hologram areas 48b and 48c.

Of the respective parts of the return light beam of the main beam asymmetrically split by the boundary 48a between the two hologram areas 48b and 48c of the hologram 48, the part diffracted by the one hologram area 48b of the hologram 48 is received by the light-receiving sections A1 and A2 on one side of the division line d4 of the light-receiving section A of the photodetector IC 44, and the part diffracted by the other hologram area 48c is received by the light-receiving sections A3 and A4 on the other side of the division line d4 of the light-receiving section A.

Thus, when the position of the objective lens 27 is deviated into the direction of radius of the optical disc 11 and the part of the return light beam of the main beam which is incident on the one hologram area 48b of the hologram 48 is smaller than the part incident on the other hologram area 48c, as shown in FIG. 8B, a dark spot is formed on the light-receiving sections A1 and A2 on the one side of the division line d4 of the light-receiving section A of the photodetector IC 44, and a bright spot is formed on the light-receiving sections A3 and A4 on the other side of the division line d4 of the light-receiving section A of the photodetector IC 44. Then, by finding the difference in the light quantity between the light received by the light-receiving sections A1 and A2 and the light received by the light-receiving sections A3 and A4, the position information of the objective lens 27 can be detected.

Meanwhile, when the position of the objective lens 27 is deviated into the direction of radius of the optical disc 11 and the part of the return light beam of the main beam which is incident on the other hologram area 48c of the hologram 48 is smaller than the part incident on the one hologram area 48c, as shown in FIG. 8C, a dark spot is formed on the light-receiving sections A3 and A4 on the other side of the division line d4 of the light-receiving section A of the photodetector IC 44, and a bright spot is formed on the light-receiving sections A1 and A2 on the one side of the division line d4 of the light-receiving section A of the photodetector IC 44. Then, by finding the difference in the light quantity between the light received by the light-receiving sections A1 and A2 and the light received by the light-receiving sections A3 and A4, the position information of the objective lens 27 can be detected.

In the optical disc device 10 to which the present invention is applied, a signal indicating the position information of the objective lens 27 is generated by carrying out predetermined arithmetic processing by the signal processing circuit 15 based on the light-receiving signals from the light-receiving sections A1, A2, A3 and A4 of the photodetector section.

The signal S1 indicating the position information of the objective lens 27 is found by the signal processing circuit 15 carrying out arithmetic processing with respect to the following equation (11), where SA1, SA2, SA3 and SA4 represent the light-receiving signals based on the return light beam of the main beam received by the light-receiving sections A1, A2, A3 and A4, respectively, of the photodetector section of the photodetector IC 44.

$$S1=(SA1+SA2)-(SA3+SA4) \tag{11}$$

The signal S1 indicating the position information of the objective lens 27, generated by the signal processing circuit 15, is supplied to the servo control section 19 via the optical disc controller 14.

Under the control of the optical disc controller 14, the servo control section 19 drives the biaxial actuator 28 of the optical pickup 20 on the basis of the signal S1 indicating the position information of the objective lens 27.

As the biaxial actuator 28 is driven by the servo control section 19 in response to the signal S1 indicating the position information of the objective lens 27, the biaxial actuator 28 carries out midpoint servo for minutely moving the objective lens 27 held by the lens holding section 31 into the direction of radius of the optical disc 11 so as to instantaneously correct the position deviation of the objective lens 27 with respect to the base 21 of the optical pickup 20 and the portions fixed thereto, and thus controls the objective lens 27 to be located constantly at the normal position.

In the optical disc device 10 to which the present invention is applied, since the access operation of the optical pickup 20 is carried out while the midpoint servo is carried out as described above, the high-speed access property is realized.

Also, in the optical disc device 10 of this embodiment, since the focusing error signal FE1 is detected by the so-called Foucault method, the spot of the return light beam formed on the light-receiving section of the photodetector IC 44 has a small diameter. Therefore, it is possible to reduce the distance between the respective spots when the main beam and two side beams generated by splitting by the grating 47 are cast onto the signal recording surface of the optical disc 11. Thus, the tolerance of the angle made by the direction of the recording track on the optical disc 11 and the line connecting the respective spots can be increased, and appropriate tracking servo and hence accurate signal recording/reproduction can be carried out even in the case where any defect such as scratch is generated on the optical disc 11.

Second Embodiment

Another embodiment of the optical disc device to which the present invention is applied will now be described. This optical disc device has the structure similar to that of the first embodiment except for the optical member of the integrated optical element, which is slightly different from that of the optical disc of the first embodiment. Therefore, the parts similar to those of the first embodiment are denoted by the same numerals and will not be described further in detail. Only the parts different from those of the first embodiment will be described in detail.

Figure 9:
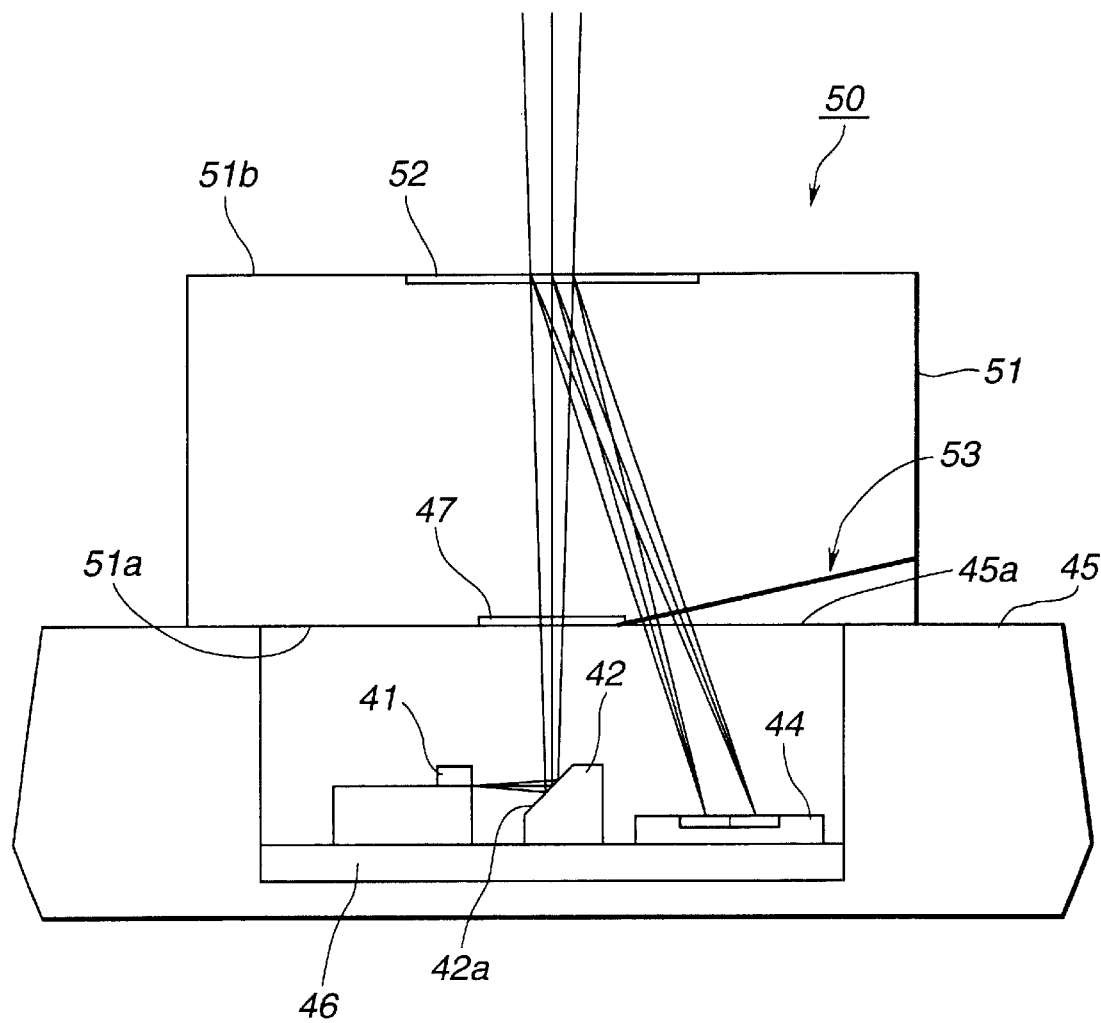
FIG. 9 is a side view schematically showing the state inside another integrated optical element to which the present invention is applied.

In the optical disc device 10 of the second embodiment, an optical pickup 20 has an integrated optical element 50 as shown in FIG. 9. The integrated optical element 50 shown in FIG. 9 has the structure similar to that of the integrated optical element 40 of the first embodiment, except for an optical member 51 in place of the optical member 43 of the integrated optical element 40 of the first embodiment.

The optical member 51 is formed in a parallel-plate shape made of a transparent plastic material or glass and having a first surface 51a and a second surface 51b which are parallel to each other. This optical member 51 is joined onto a package member 45 so as to close an aperture 45a of the package member 45 by the first surface 51a.

On the first surface 51a of the optical member 51, a grating 47 as light beam splitting means is integrally formed at a position on the optical path of the light beam which is reflected by a prism 42 and incident on the optical member 51.

This grating 47, similar to the grating 47 of the integrated optical element 40 of the first embodiment, has a plurality of grooves extending in a direction slightly inclined with respect to the direction corresponding to the direction of radius of the optical disc 11. The grating 47 has a function to split the light beam incident on the optical member 51 into a plurality of beams including at least a main beam made up of a 0th-order diffracted light and two side beams made up of plus and minus 1st-order diffracted lights by the diffraction effect of these grooves.

On the second surface 51b of the optical member 51, a hologram 52 as optical path branching means is integrally formed at a position on the optical path of the return light beam which is reflected by the signal recording surface of the optical disc 11, then passed through an objective lens 27 and incident again on the optical member 51.

Unlike the hologram 48 of the integrated optical element 40 of the first embodiment, this hologram 52 as a whole is one hologram area. This hologram area is made of a holographic grating constituted by a plurality of grooves extending in a direction inclined at approximately −45 degrees with respect to the direction corresponding to the direction of radius of the optical disc 11 indicated by an arrow X, as shown in FIG. 10.

This hologram 52 directly transmits the light beam incident on the optical member 51 from the first surface 51a, that is, the light beam directed toward the optical disc 11, and diffracts the light beam incident on the optical member 51 from the second surface 51b, that is, the return light beam reflected by the signal recording surface of the optical disc 11, into the direction toward a photodetector IC 44.

As the return light beam reflected by the signal recording surface of the optical disc 11 is diffracted by the hologram 52 into the direction toward the photodetector IC 44, the optical path of the return light beam is separated from the optical path of the light beam incident on the optical member 51 from the first surface 51a.

Figure 10:
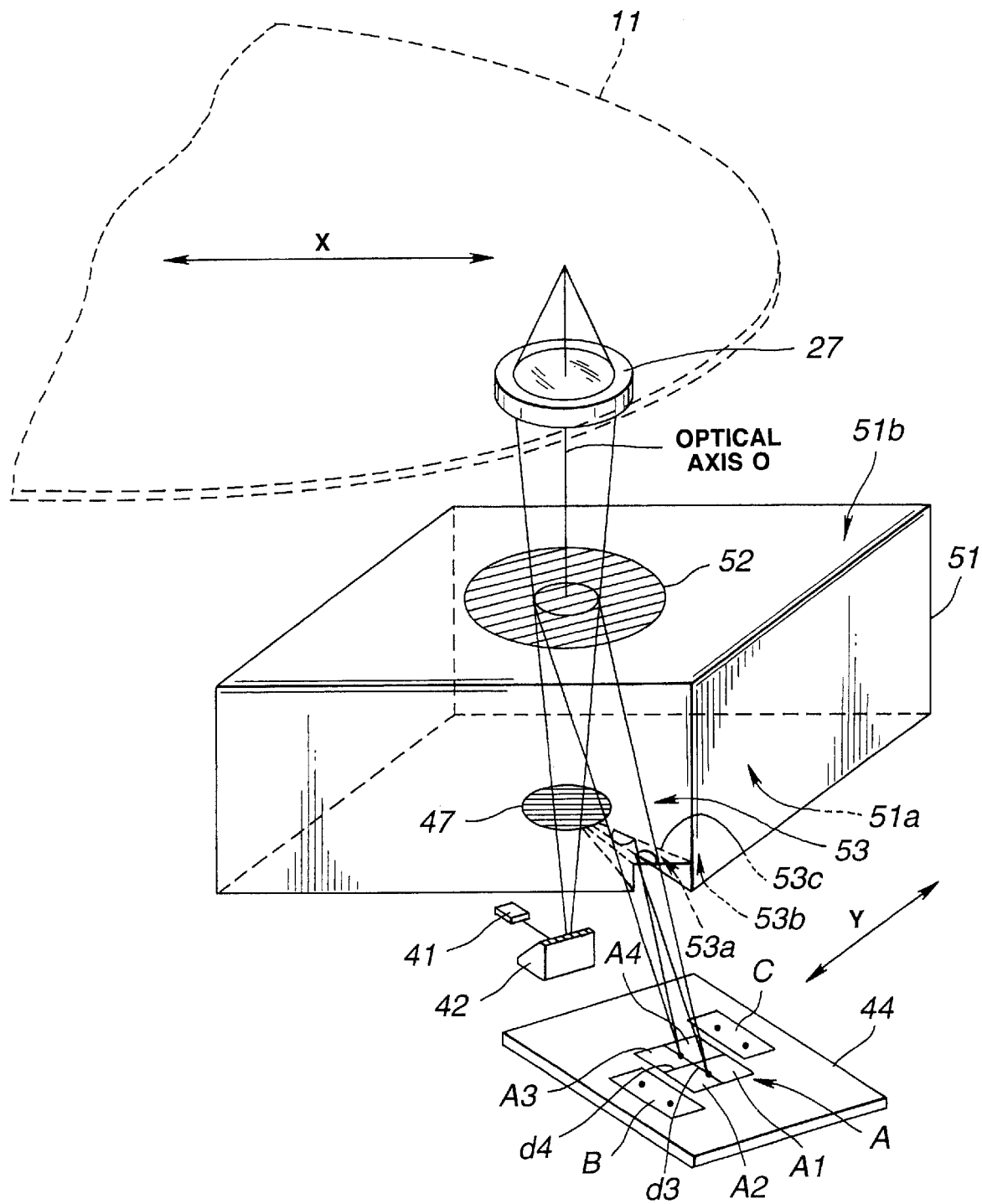
FIG. 10 is a perspective view schematically showing the positional relation of individual members constituting another optical pickup to which the present invention is applied.
Figure 11:
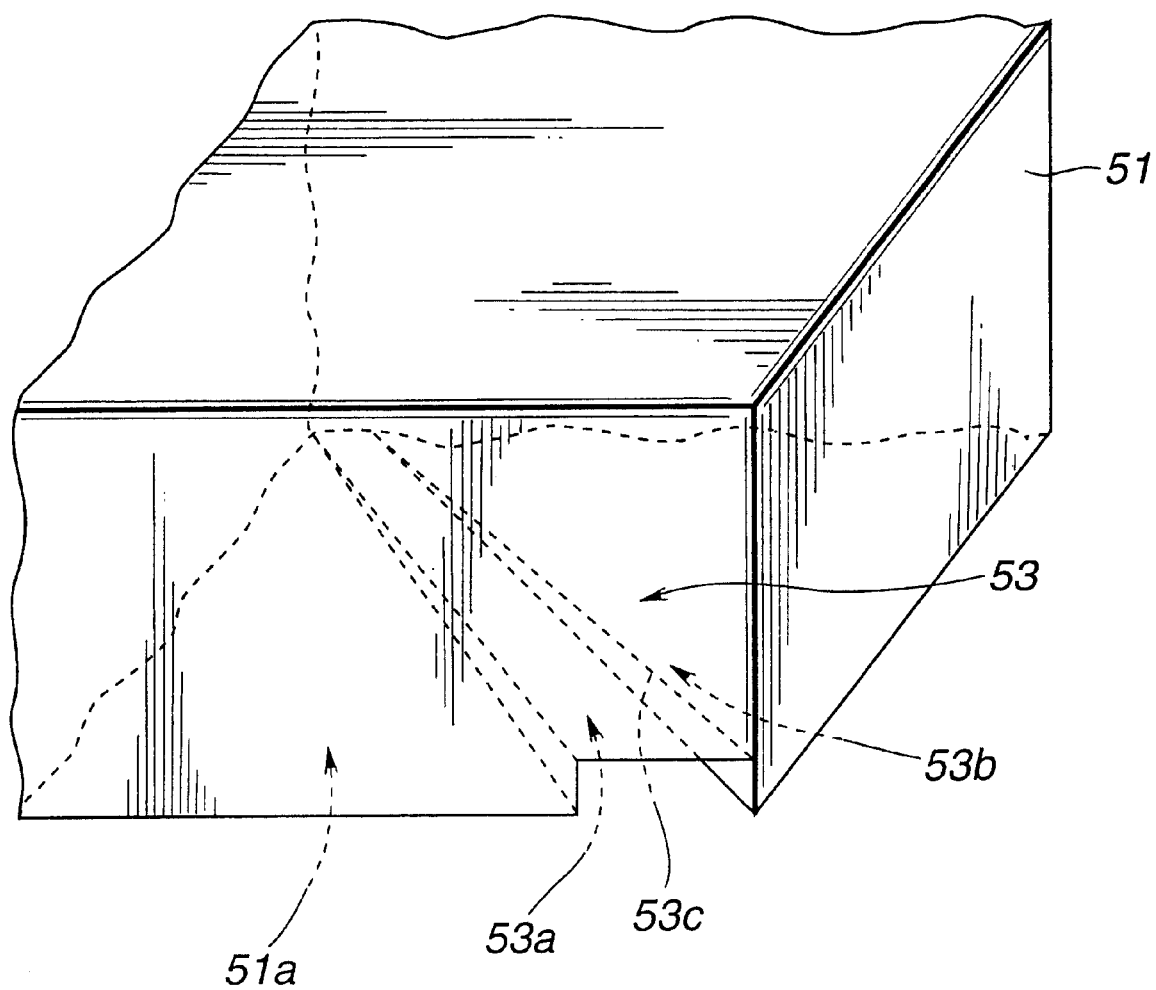
FIG. 11 is an enlarged perspective view showing essential portions of an optical member provided in another optical pickup to which the present invention is applied.

Also, on the first surface 51a of the optical member 51, a Foucault prism 53 as return light beam splitting means is integrally formed at a position on the optical path of the return light beam diffracted by the hologram 52, as shown in FIGS. 10 and 11.

This Foucault prism 53 includes two surfaces 53a and 53b which have different normal vectors. In this Foucault prism 53, a boundary 53c between the two surfaces 53a and 53b is formed on the first surface 51a of the optical member 51 so as to pass through the center of the return light beam of the main beam diffracted by the hologram 52 and so as not to coincide with the direction corresponding to the direction of radius of the optical disc 11, that is, so as to be inclined at a predetermined inclination with respect to the direction corresponding to the direction of radius of the optical disc 11. Specifically, the boundary 53c between the two surfaces 53a and 53b of the Foucault prism 53 is inclined at approximately 45 degrees with respect to the direction corresponding to the direction of radius of the optical disc 11, as shown in FIG. 10.

In FIG. 10, it is assumed that the direction corresponding to the direction of radius of the optical disc 11 is the same as the direction of radius of the optical disc 11.

Of the two surfaces 53a and 53b of the Foucault prism 53, the normal vector of the one surface 53a forms the same angle as the diffraction angle of the hologram 52, with respect to the normal vector of the other surface 53b. Moreover, the normal vector of the other surface 53b has the same component as the normal vector of the first surface 51a of the optical member 51.

The return light beam, diffracted by the hologram 52 and incident on the Foucault prism 53, is split into two beams by the boundary 53c between the two surfaces 53a and 53b of the Foucault prism 53, and a portion incident on the one surface 53a and a portion incident on the other surface 53b travel into different directions and are directed toward different positions on the photodetector IC 44.

Thus, in the optical pickup 20 having this integrated optical element 50, as the individual portions of the return light beam generated by splitting by the boundary 53c between the two surfaces 53a and 53b of the Foucault prism 53 and directed toward different positions on the photodetector IC 44 are received by the corresponding portions of the light-receiving section of the photodetector IC 44, a focusing error signal can be detected by the so-called Foucault method.

Also, since the boundary 53c between the two surfaces 53a and 53b of the Foucault prism 53 is formed so as not to coincide with the direction corresponding to the direction of radius of the optical disc 11, the position information of the objective lens 27 can be detected by finding the difference in the light quantity of the return light beam split by the boundary 53c between the two surfaces 53a and 53b of the Foucault prism 53.

That is, in the case where the Foucault prism 53 is constituted as described above, when the position of the objective lens 27 with respect to the optical member 51, that is, the position of the objective lens 27 with respect to the integrated optical element 50 and the base 21 of the optical pickup 20 holding the integrated optical element, is deviated into the direction of radius of the optical disc 11 from the normal position, the return light beam passed through the objective lens 27, then diffracted by the hologram 52 and incident on the Foucault prism 53 is asymmetrically split by the boundary 53c between the two surfaces 53a and 53b of the Foucault prism 53. The respective parts of the return light beam generated by the asymmetrical splitting are received by the corresponding portions of the light-receiving section of the photodetector IC 44.

Therefore, in the optical pickup 20, the position deviation of the objective lens 27 into the direction of radius of the optical disc 11 can be detected by finding the difference in the light quantity of the respective parts of the return light beam received by the corresponding portions of the light-receiving section of the photodetector IC 44.

In the above description, the boundary 53c between the two surfaces 53a and 53b of the Foucault prism 53 is inclined at approximately 45 degrees with respect to the direction corresponding to the direction of radius of the optical disc 11. However, the angle of inclination of the boundary 53c with respect to the direction corresponding to the direction of radius of the optical disc 11 may be suitably set within such a range that a sensitivity necessary for detecting the position deviation of the objective lens 27 in the direction of radius of the optical disc 11 can be obtained.

The range which allows obtaining the sensitivity necessary for detecting the position deviation of the objective lens 27 in the direction of radius of the optical disc 11 is more or less dependent on the performance of the individual members constituting the optical pickup 20. In general, as long as the boundary 53c is inclined at 15 degrees or more with respect to the direction corresponding to the direction of radius of the optical disc 11, the sensitivity necessary for detecting the position deviation of the objective lens 27 in the direction of radius of the optical disc 11 can be obtained satisfactorily.

Therefore, it is desired that the boundary 53c between the two surfaces 53a and 53b of the Foucault prism 53 is inclined at 15 degrees or more with respect to the direction corresponding to the direction of radius of the optical disc 11.

The operation for reproducing the signals recorded on the optical disc 11 by using the optical disc device 10 of the second embodiment constituted as described above will now be described.

In reproducing the signals recorded on the optical disc 11 by using the optical disc device 10, first, the optical disc 11 is mounted on the spindle motor 12. Then, as the spindle motor 12 is rotationally driven at a predetermined number of rotations under the control of the optical disc controller 14, the optical disc 11 is rotated.

A light beam is emitted from the semiconductor laser element 41 provided in the integrated optical element 50 of the optical pickup 20. Then, as the thread motor of the head access control section 18 is driven under the control of the optical disc controller 14, the optical pickup 20 is moved at a high speed in the direction of radius of the optical disc 11 so as to access a predetermined recording track on the signal recording surface of the optical disc 11.

The light beam emitted from the semiconductor laser element 41 is reflected by the inclined surface 42a of the prism 42 and becomes incident on the optical member 51 from its first surface 51a via the aperture 45a of the package member 45. The light beam incident on the optical member 51 is split into a plurality of beams including a main beam and two side beams by the grating 47 provided on the first surface 51a of the optical member 51, then transmitted through the optical member 51, and emitted from the integrated optical element 50.

The light beam emitted from the integrated optical element 50 is reflected by the reflection surface 32a of the rise mirror 32 and becomes incident on the objective lens 27. The light beam incident on the objective lens 27 is converged by the objective lens 27 and then cast onto the predetermined recording track on the signal recording surface of the optical disc 11. In this case, three beam spots are formed on the signal recording surface of the optical disc 11 by the main beam and two side beams generated by splitting by the grating 47.

The light beam cast onto the signal recording surface of the optical disc 11 is reflected by the signal recording surface of the optical disc 11 so as to be a return light beam including a signal component, which is transmitted again through the objective lens 27 and becomes incident on the optical member 51 from its second surface 51b.

The return light beam incident on the optical member 51 from its second surface 51b is diffracted by the hologram 52 formed on the second surface 51b of the optical member 51, and the optical path of this return light beam is thus separated from the optical path of the light beam incident on the optical member 51 from its first surface 51a.

The return light beam, diffracted by the hologram 52 formed on the second surface 51b of the optical member 51, is transmitted through the optical member 51 and is split into two beams by the Foucault prism 53 formed on the first surface 51a of the optical member 51. The part incident on the one surface 53a of the Foucault prism 53 and the part incident on the other surface 53b travel in different directions in accordance with the normal vectors of the respective surfaces and are directed toward different positions on the photodetector IC 44.

The two beams of the return light beam, generated by splitting by the Foucault prism 53, become incident on the package member 45 via the aperture 45a of the package member 45, then reach the photodetector IC 44, and are received respectively by the light-receiving sections A1, A2, A3, A4, B and C of the photodetector section of the photodetector IC 44.

Of the return light beams having reached the photodetector IC 44, return light beams of the two side beams generated by splitting by the grating 47 are received respectively by the light-receiving section B and the light-receiving section C of the photodetector section.

Of the return light beams having reached the photodetector IC 44, a return light beam of the main beam which is incident on the one surface 53a of the Foucault prism 53a is received by the light-receiving sections A3 and A4 on one side of the division line d4 of the light-receiving section A. Of the return light beams having reached the photodetector IC 44, a return light beam of the main beam which is incident on the other surface 53b of the Foucault prism 53 is received by the light-receiving sections A1 and A2 on the other side of the division line d4 of the light-receiving section A.

The return light beams received by the respective light-receiving sections A1, A2, A3, A4, B and C of the photodetector section are detected as current values based on the light quantities by these light-receiving sections A1, A2, A3, A4, B and C. The current values based on the light quantities of the return light beams are converted to voltage values by the voltage conversion circuit and are supplied as light-receiving signals to the signal processing circuit 15.

Then, the signal processing circuit 15 carries out predetermined arithmetic processing based on the light-receiving signals, thereby generating a reproduction signal RF2. Also, a focusing error signal FE2 is generated by the so-called Foucault method and a tracking error signal TR2 is generated by the so-called three-beam method.

In the optical disc device 10 of this embodiment, as the signal processing circuit 15 carries out predetermined arithmetic processing based on the light-receiving signals, a signal S2 indicating the position information of the objective lens is generated.

The reproduction signal RF2 is found by the signal processing circuit 15 carrying out arithmetic processing with respect to the following equation (12), where SA1, SA2, SA3 and SA4 represent the light-receiving signals based on the return light beam of the main beam received by the light-receiving sections A1, A2, A3 and A4 of the photodetector section of the photodetector IC 44.

$$RF2=(SA1+SA2)+(SA3+SA4) \quad (12)$$

The reproduction signal RF2 generated by the signal processing circuit 15 is processed by error correction and then transmitted to an external computer or the like via the interface 17. Thus, the external computer or the like can receive the signal recorded on the optical disc 11 as the reproduction signal.

The focusing error signal FE2 is found by the signal processing circuit 15 carrying out arithmetic processing with respect to the following equations (13), (14) or (15), where SA1, SA2, SA3 and SA4 represent the light-receiving signals based on the return light beam of the main beam received by the light-receiving sections A1, A2, A3 and A4 of the photodetector section of the photodetector IC 44.

$$FE2=SA1-SA2 \quad (13)$$

$$FE2=SA3-SA4 \quad (14)$$

$$FE2=(SA1+SA3)-(SA2+SA4) \quad (15)$$

The tracking error signal TR2 is found by the signal processing circuit 15 carrying out arithmetic processing with respect to the following equation (16), where SB and SC represent the light-receiving signals based on the return light beams of the two side beams received by the light-receiving sections B and C of the photodetector section of the photodetector IC 44.

$$TR2=SB-SC \quad (16)$$

The focusing error signal FE2 and the tracking error signal TR2 generated by the signal processing circuit 15 are supplied to the servo control section 19 via the optical disc controller 14.

On the basis of the focusing error signal FE2 and the tracking error signal TR2, the servo control section 19 drives the biaxial actuator 28 of the optical pickup 20 under the control of the optical disc controller 14.

As the biaxial actuator 28 is driven by the servo control section 19 in accordance with the focusing error signal FE2 and the tracking error signal TR2, the biaxial actuator 28 carries out focusing servo to minutely move the objective lens 27 held by the lens holding section 31 into the direction toward and away from the signal recording surface of the optical disc 11, thus controlling the focal point of the light beam converged by the objective lens 27 so as to be constantly located on the signal recording surface of the optical disc 11. The biaxial actuator 28 also carries out tracking servo to minutely move the objective lens 27 held by the lens holding section 31 into the direction of radius of the optical disc 11, thus controlling the spot of the light beam converged by the objective lens 27 so as to follow the recording track on the optical disc 11.

By thus reading the reproduction signal while carrying out the focusing servo and tracking servo, the optical disc device 10 can appropriately reproduce the signals recorded on the optical disc 11 even in the case where the optical disc 11 is fluctuated or tilted.

Meanwhile, in the case where the signals recorded on the optical disc 11 are to be reproduced by this optical disc device 10, first the optical pickup 20 is moved at a high speed into the direction of radius of the optical disc 11 mounted on the spindle motor 12 so as to access a predetermined recording track on the signal recording surface of the optical disc 11, as described above. In this case, the tracking servo is off.

The objective lens 27 of the optical pickup 20 is held by the lens holding section 31 movably supported to the fixed portion 29 of the biaxial actuator 28 via the suspension 30, as described above. Therefore, when the optical pickup 20 is moved at a high speed into the direction of radius of the optical disc 11, or when this movement is stopped, the position of the objective lens 27 with respect to the fixed portion 29, that is, the position of the objective lens 27 with respect to the base 21 of the optical pickup 20 and the portion fixed thereto is deviated into the direction of radius of the optical disc 11 from the normal position, under the influence of inertia.

Thus, in the optical disc device 10 to which the present invention is applied, the position of the objective lens 27 is instantaneously recovered to realize the high-speed access property, by detecting the deviation of the objective lens 27 from the normal position as position information, then causing the servo control section 19 to drive the biaxial actuator 28 of the optical pickup 20 on the basis of the position information of the objective lens 27, and then carrying out so-called midpoint servo for correcting the position deviation of the objective lens 27.

Figure 12A:
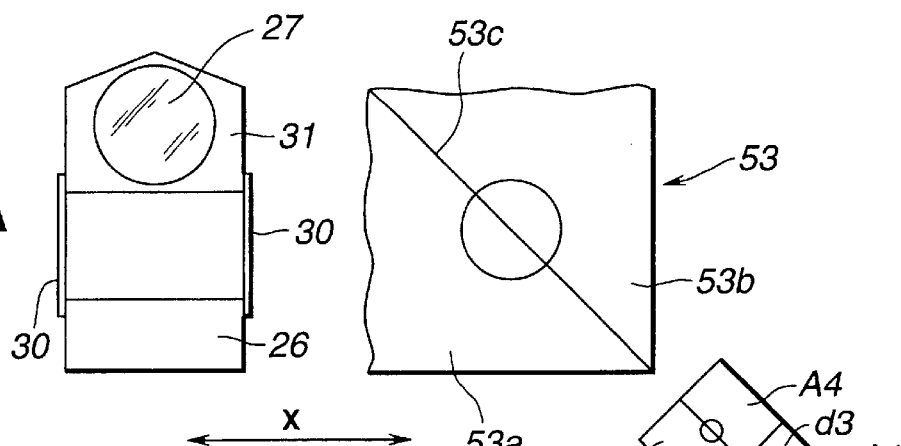
FIGS. 12A to 12C show the relation between the position of an objective lens in another optical pickup to which the present invention is applied and the position of a return light spot formed on a Foucault prism.
Figure 12B:
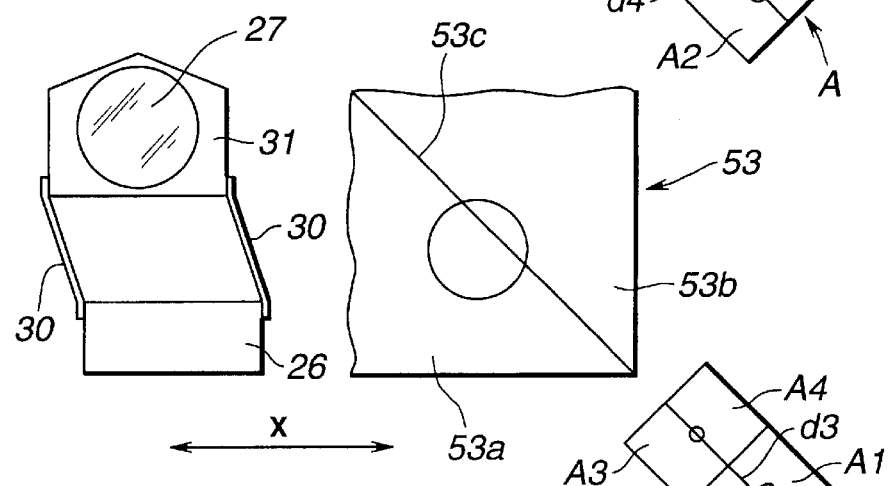
Figure 12C:
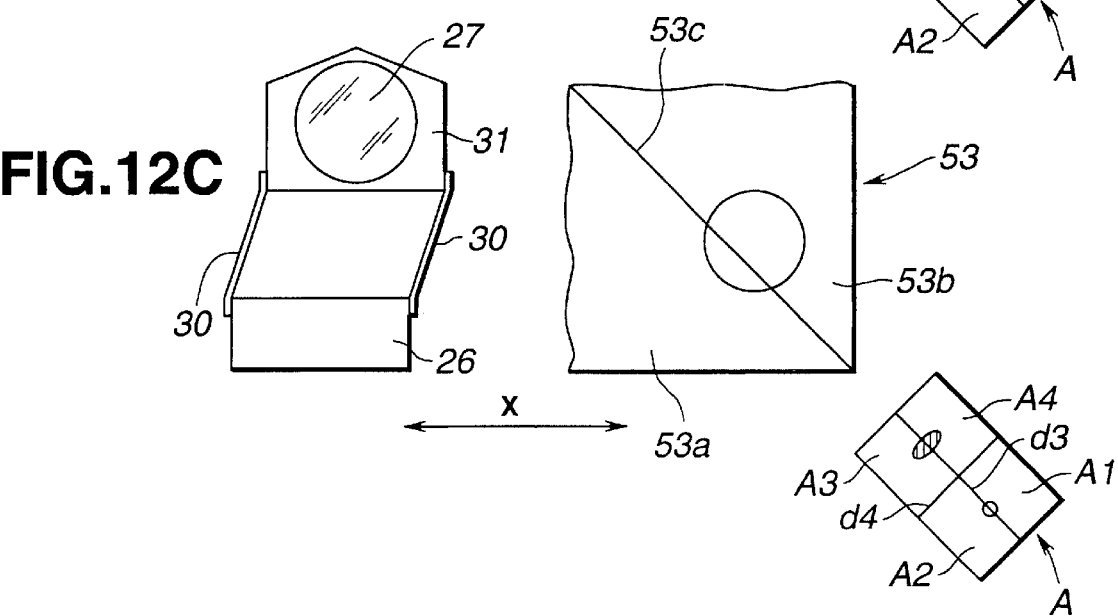

In the optical disc device 10 to which the present invention is applied, when the position of the objective lens 27 with respect to the base 21 of the optical pickup 20 and the portion fixed thereto is deviated from the normal position indicated in FIG. 12A into the direction of radius of the optical disc 11 indicated by an arrow X in FIGS. 12B and 12C, the spot of the return light beam diffracted by the hologram 52 formed on the second surface 51b of the optical member 51 of the integrated optical element 50 is deviated into the direction corresponding to the direction of radius of the optical disc 11, on the Foucault prism 53 formed on the first surface 51a of the optical member 51.

When the objective lens 27 is at the normal position, the Foucault prism 53 is divided into the two surfaces 53a and 53b by the boundary 53c passing through the center of the return light beam of the main beam diffracted by the hologram 52, and the boundary 53c between the two surfaces 53a and 53b is inclined at a predetermined angle so as not to coincide with the direction corresponding to the direction of radius of the optical disc 11.

Thus, when the position of the objective lens 27 with respect to the base 21 of the optical pickup 20 and the portion fixed thereto is deviated into the direction of radius of the optical disc 11 from the normal position, the return light beam of the main beam incident on the Foucault prism 53 is asymmetrically split by the boundary 53c between the two surfaces 53a and 53b of the Foucault prism 53.

Specifically, when the objective lens 27 is at the normal position, the return light beam of the main beam becomes uniformly incident on the two surfaces 53a and 53b of the Foucault prism 53 and split into two parts substantially uniformly by the boundary 53c between the two surfaces, as shown in FIG. 12A.

On the other hand, when the position of the objective lens 27 is deviated into the direction of radius of the optical disc 11, the part of the return light beam of the main beam which is incident on the one surface 53a of the Foucault prism 53 is greater than the part incident on the other surface 53b, as shown in FIG. 12B, or the part of the return light beam of the main beam which is incident on the other surface 53b of the Foucault prism 53 is greater than the part incident on the one surface 53a, as shown in FIG. 12C. Thus, the return light beam of the main beam is asymmetrically split by the boundary 53c between the two surfaces 53a and 53b.

Of the respective parts of the return light beam of the main beam asymmetrically split by the boundary 53c between the two surfaces 53a and 53b of the Foucault prism 53, the part incident on the one surface 53a of the Foucault prism 53 is received by the light-receiving sections A3 and A4 on one side of the division line d4 of the light-receiving section A of the photodetector IC 44, and the part incident on the other surface 53b of the Foucault prism 53 is received by the light-receiving sections A1 and A2 on the other side of the division line d4 of the light-receiving section A.

Thus, when the position of the objective lens 27 is deviated into the direction of radius of the optical disc 11 and the part of the return light beam of the main beam which is incident on the one surface 53a of the Foucault prism 53 is greater than the part incident on the other surface 53b, as shown in FIG. 12B, a dark spot is formed on the light-receiving sections A1 and A2 on the one side of the division line d4 of the light-receiving section A of the photodetector IC 44, and a bright spot is formed on the light-receiving sections A3 and A4 on the other side of the division line d4 of the light-receiving section A of the photodetector IC 44. Then, by finding the difference in the light quantity between the light received by the light-receiving sections A1 and A2 and the light received by the light-receiving sections A3 and A4, the position information of the objective lens 27 can be detected.

Meanwhile, when the position of the objective lens 27 is deviated into the direction of radius of the optical disc 11 and the part of the return light beam of the main beam which is incident on the other surface 53b of the Foucault prism 53 is greater than the part incident on the one surface 53a, as shown in FIG. 12C, a dark spot is formed on the light-receiving sections A3 and A4 on the other side of the division line d4 of the light-receiving section A of the photodetector IC 44, and a bright spot is formed on the light-receiving sections A1 and A2 on the one side of the division line d4 of the light-receiving section A of the photodetector IC 44. Then, by finding the difference in the light quantity between the light received by the light-receiving sections A1 and A2 and the light received by the light-receiving sections A3 and A4, the position information of the objective lens 27 can be detected.

In the optical disc device 10 of this embodiment, a signal indicating the position information of the objective lens 27 is generated by carrying out predetermined arithmetic processing by the signal processing circuit 15 based on the light-receiving signals from the light-receiving sections A1, A2, A3 and A4 of the photodetector section.

The signal S2 indicating the position information of the objective lens 27 is found by the signal processing circuit 15 carrying out arithmetic processing with respect to the following equation (17), where SA1, SA2, SA3 and SA4 represent the light-receiving signals based on the return light beam of the main beam received by the light-receiving sections A1, A2, A3 and A4, respectively, of the photodetector section of the photodetector IC 44.

$$S2=(SA1+SA2)-(SA3+SA4) \tag{17}$$

The signal S2 indicating the position information of the objective lens 27, generated by the signal processing circuit 15, is supplied to the servo control section 19 via the optical disc controller 14.

Under the control of the optical disc controller 14, the servo control section 19 drives the biaxial actuator 28 of the optical pickup 20 on the basis of the signal S2 indicating the position information of the objective lens 27.

As the biaxial actuator 28 is driven by the servo control section 19 in response to the signal S2 indicating the position information of the objective lens 27, the biaxial actuator 28 carries out midpoint servo for minutely moving the objective lens 27 held by the lens holding section 31 into the direction of radius of the optical disc 11 so as to instantaneously correct the position deviation of the objective lens 27 with respect to the base 21 of the optical pickup 20 and the portions fixed thereto, and thus controls the objective lens 27 to be located constantly at the normal position.

In the optical disc device 10 of this embodiment, since the access operation of the optical pickup 20 is carried out while the midpoint servo is carried out as described above, the high-speed access property is realized.

Also, in the optical disc device 10 of this embodiment, since the focusing error signal FE2 is detected by the so-called Foucault method, the spot of the return light beam formed on the light-receiving section of the photodetector IC 44 has a small diameter. Therefore, it is possible to reduce the distance between the respective spots when the main beam and two side beams generated by splitting by the grating 47 are cast onto the signal recording surface of the optical disc 11. Thus, the tolerance of the angle made by the direction of the recording track on the optical disc 11 and the line connecting the respective spots can be increased, and appropriate tracking servo and hence accurate signal recording/reproduction can be carried out even in the case where any defect such as scratch is generated on the optical disc 11.

Third Embodiment

Still another embodiment of the optical disc device to which the present invention is applied will now be described. This optical disc device has the basic structure similar to that of the optical disc device 10 of the first embodiment and is characterized in that it is adapted to detect a tracking error signal by a so-called push-pull method.

Therefore, in the following description, only this characteristic point will be described. The parts similar to those of the first embodiment are denoted by the same numerals and will not be described further in detail.

Figure 13:
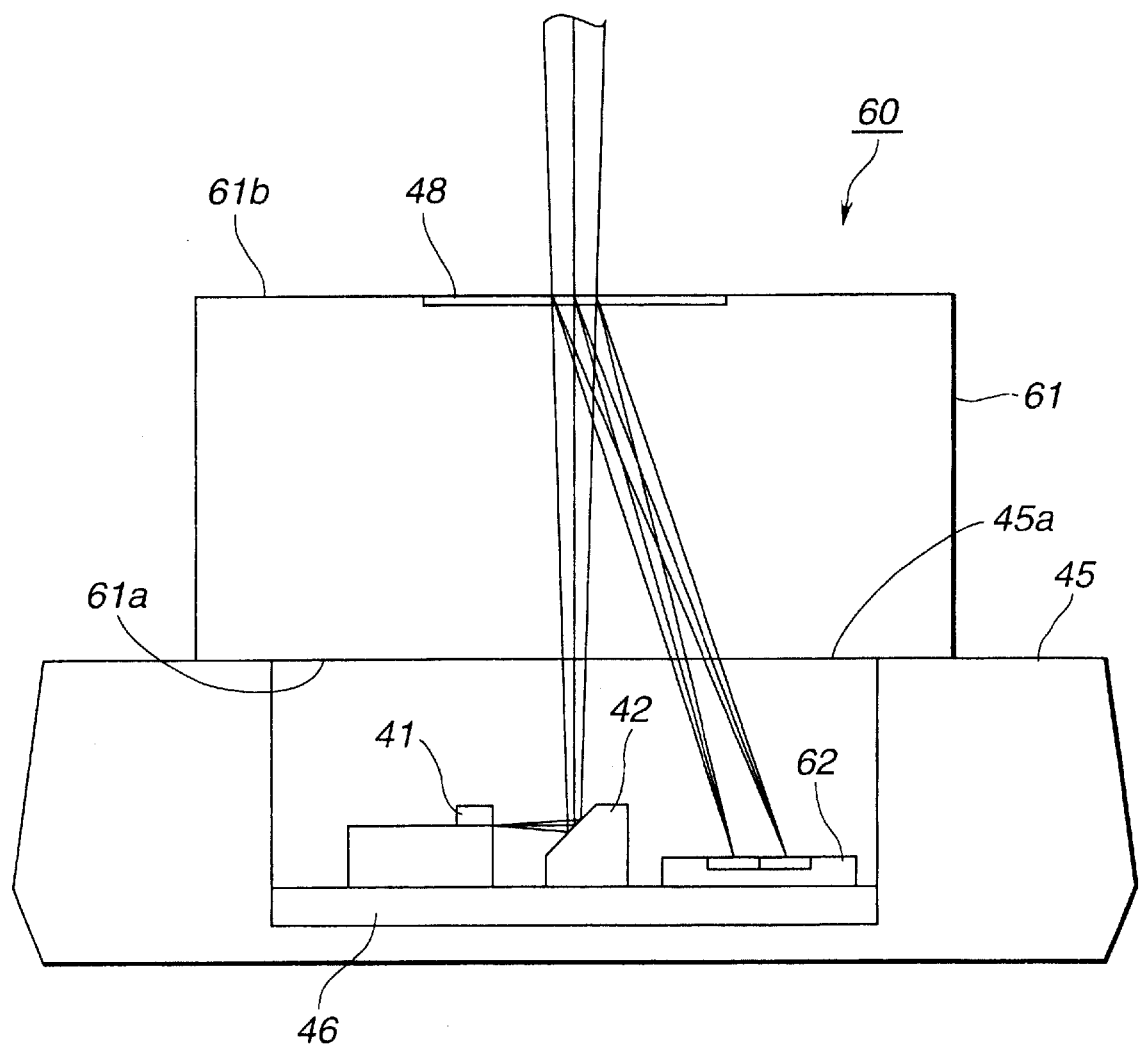
FIG. 13 is a side view schematically showing the state inside still another integrated optical element to which the present invention is applied.

In the optical disc device 10 of the third embodiment, an optical pickup 20 has an integrated optical element 60 as shown in FIG. 13. The integrated optical element 60 shown in FIG. 13 has the structure similar to that of the integrated optical element 40 of the first embodiment, except for an optical member 61 in place of the optical member 43 of the integrated optical element 40 of the first embodiment and for a photodetector IC 62 in place of the photodetector IC 44 of the integrated optical element 40 of the first embodiment.

The optical member 61 is formed in a parallel-plate shape made of a transparent plastic material or glass and having a first surface 61a and a second surface 61b which are parallel to each other. This optical member 61 is joined onto the package member 45 so as to close the aperture 45a of the package member 45 by the first surface 6a.

On the first surface 61a of the optical member 61, there is formed no grating 47 such as the one integrally formed on the first surface 43a of the optical member 43 of the first embodiment is not formed. Therefore, a light beam incident on the optical member 61 from its first surface 61a is transmitted through the optical member 61 without being split into a plurality of beams.

On the second surface 61b of the optical member 61, a hologram 48 similar to the one formed on the second surface 43b of the optical member 43 of the first embodiment is integrally formed.

This hologram 48 directly transmits the light beam incident on the optical member 61 from the first surface 61 a, that is, the light beam directed toward the optical disc 11, and diffracts the light beam incident on the optical member 61 from the second surface 61b, that is, the return light beam reflected by the signal recording surface of the optical disc 11, into the direction toward the photodetector IC 62.

As the return light beam reflected by the signal recording surface of the optical disc 11 is diffracted by the hologram 48 into the direction toward the photodetector IC 62, the optical path of the return light beam is separated from the optical path of the light beam incident on the optical member 61 from the first surface 61a.

Figure 14:
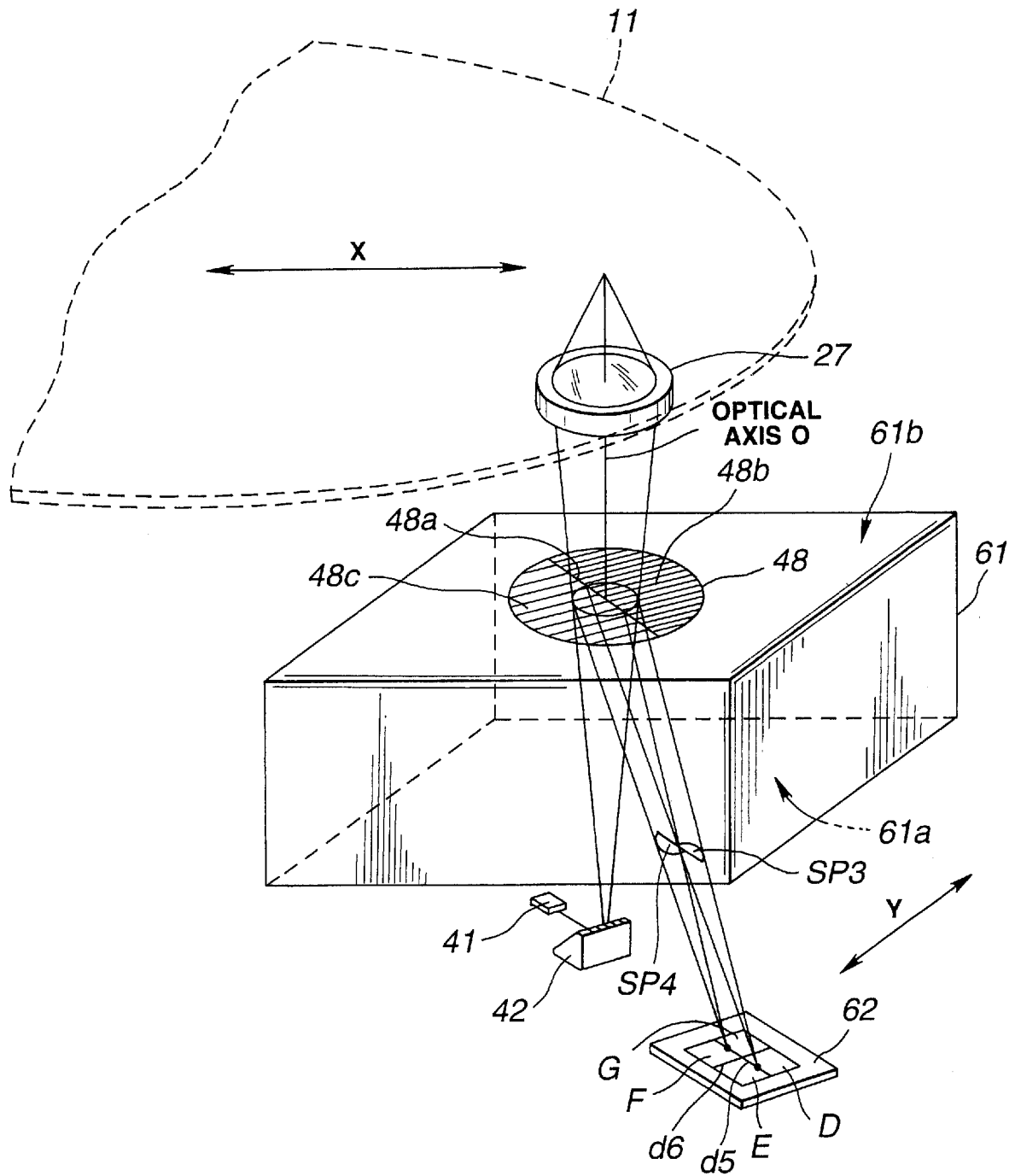
FIG. 14 is a perspective view schematically showing the positional relation of individual members constituting still another optical pickup to which the present invention is applied.

This hologram 48 is bisected along a boundary 48a passing through the optical axis O of the return light beam of the main beam and thus has two hologram areas 48b and 48c in which holographic gratings of different main diffraction angles are formed, respectively, as shown in FIG. 14. The holographic gratings of the two hologram areas 48b and 48c are constituted by a plurality of grooves extending in a substantially perpendicular direction with respect to the boundary 48a. Therefore, the return light beam incident on the hologram 48 is split into two beams by the boundary 48a of the hologram 48, and a portion incident on the one hologram area 48b and a portion incident on the other hologram area 48c are diffracted at different diffraction angles into the direction along the boundary 48a. The diffracted beams are directed to different positions on the photodetector IC 62 as beams forming substantially semi-circular spots as indicated by spots SP3 and SP4 in FIG. 14.

In the optical pickup 20, as the individual portions of the return light beam generated by splitting by the boundary 48a of the hologram 48 and directed toward different positions on the photodetector IC 62 are received by the corresponding portions of the light-receiving section of the photodetector IC 62, a focusing error signal can be detected by the so-called Foucault method.

In the hologram 48, the boundary 48a between the two hologram areas 48b and 48c is inclined at a predetermined inclination with respect to the direction corresponding to the direction of radius of the optical disc 11 so that the boundary does not coincide with the direction corresponding to the direction of radius of the optical disc 11 indicated by an arrow X in FIG. 14. Specifically, the boundary 48a between the two hologram areas 48b and 48c of the hologram 48 is inclined at approximately 45 degrees with respect to the direction corresponding to the direction of radius of the optical disc 11.

In FIG. 14, to simplify the description, the direction corresponding to the direction of radius of the optical disc 11 is the same as the direction of radius of the optical disc 11.

As described above, in the case where the boundary 48a between the two hologram areas 48b and 48c of the hologram 48 is not coincident with the direction corresponding to the direction of radius of the optical disc 11, when the position of the objective lens 27 with respect to the optical member 61, that is, the position of the objective lens 27 with respect to the integrated optical element 40 and the base 21 of the optical pickup 20 holding the integrated optical element, is deviated into the direction of radius of the optical disc 11 from the normal position, the return light beam passed through the objective lens 27 and incident on the hologram 48 is asymmetrically split by the boundary 48a between the two hologram areas 48b and 48c of the hologram 48. The respective parts of the return light beam generated by the asymmetrical splitting are received by the corresponding portions of the light-receiving section of the photodetector IC 62.

Thus, in the optical pickup 20, the position deviation of the objective lens 27 in the direction of radius of the optical disc 11 can be detected by finding the difference in the light quantity of the respective parts of the return light beam received by the corresponding portions of the light-receiving section of the photodetector IC 62.

In the above description, the boundary 48a between the two hologram areas 48b and 48c of the hologram 48 is inclined at approximately 45 degrees with respect to the direction corresponding to the direction of radius of the optical disc 11. However, the angle of inclination of the boundary 48a with respect to the direction corresponding to the direction of radius of the optical disc 11 may be suitably set within such a range that a sensitivity necessary for detecting the position deviation of the objective lens 27 in the direction of radius of the optical disc 11 can be obtained.

The range which allows obtaining the sensitivity necessary for detecting the position deviation of the objective lens 27 in the direction of radius of the optical disc 11 is more or less dependent on the performance of the individual members constituting the optical pickup 20. In general, as long as the boundary 48a is inclined at 15 degrees or more with respect to the direction corresponding to the direction of radius of the optical disc 11, the sensitivity necessary for detecting the position deviation of the objective lens 27 in the direction of radius of the optical disc 11 can be obtained satisfactorily.

Therefore, it is desired that the boundary 48a between the two hologram areas 48b and 48c of the hologram 48 is inclined at 15 degrees or more with respect to the direction corresponding to the direction of radius of the optical disc 11.

The photodetector IC 62 has a photodetector section for receiving the return light beam diffracted by the hologram 48 and transmitted through the optical member 61, and a voltage conversion circuit for converting a current from the photodetector section to a voltage. These section and circuit are integrated as one element.

The photodetector section of the photodetector IC 61 has, as shown in FIG. 14, four light-receiving sections D, E, F and G arranged by division lines which are parallel to the boundary 48a between the two hologram areas 48b and 48c of the hologram 48, that is, a division line d5 inclined at approximately 45 degrees with respect to the direction corresponding to the direction of radius of the optical disc 11 and a division line d6 orthogonal to the division line d5.

In the photodetector section of the photodetector IC 62, the light-receiving sections D and E of these light-receiving sections on one side of the division line d6 receive a part of the return light beam which is diffracted by the one hologram area 48b of the hologram 48, and the light-receiving sections F and G on the other side of the division line d6 receive a part of the return light beam which is diffracted by the other hologram area 48c of the hologram 48.

In the photodetector IC 62, the current values based on the light quantities of the return lights received by the light-receiving sections D, E, F and G of the photodetector section are converted to voltage values by the voltage conversion circuit and are supplied as light-receiving signals to the signal processing circuit 15 of the optical disc device 10. Then, the signal processing circuit 15 carries out predetermined arithmetic processing based on the light-receiving signals, thereby generating a reproduction signal RF3. Also, a focusing error signal FE3 is generated by the so-called Foucault method and a tracking error signal TR3 is generated by the so-called push-pull method. Moreover, a signal S3 indicating the position information of the objective lens 27 is generated.

The reproduction signal RF3 is found by the signal processing circuit 15 carrying out arithmetic processing with respect to the following equation (18), where SD, SE, SF and SG represent the light-receiving signals based on the return light beam of the main beam received by the light-receiving sections D, E, F and G of the photodetector section of the photodetector IC 62.

$$RF3=(SD+SE)+(SF+SG) \quad (18)$$

The reproduction signal RF3 generated by the signal processing circuit 15 is processed by error correction and then transmitted to an external computer or the like via the interface 17. Thus, the external computer or the like can receive the signal recorded on the optical disc 11 as the reproduction signal.

The focusing error signal FE3 is found by the signal processing circuit 15 carrying out arithmetic processing with respect to the following equations (19), (20) or (21).

$$FE3=SD-SE \quad (19)$$

$$FE3=SF-SG \quad (20)$$

$$FE3=(SD+SF)-(SE+SG) \quad (21)$$

The tracking error signal TR3 is found by the signal processing circuit 15 carrying out arithmetic processing with respect to the following equation (22).

$$TR3=(SD+SE)-(SF+SG) \quad (22)$$

The focusing error signal FE3 and the tracking error signal TR3 generated by the signal processing circuit 15 are supplied to the servo control section 19 via the optical disc controller 14.

On the basis of the focusing error signal FE3 and the tracking error signal TR3, the servo control section 19 drives the biaxial actuator 28 of the optical pickup 20 so as to carry out focusing servo and tracking servo under the control of the optical disc controller 14.

By thus reading the reproduction signal while carrying out the focusing servo and tracking servo, the optical disc device 10 can appropriately reproduce the signals recorded on the optical disc 11 even in the case where the optical disc 11 is fluctuated or tilted.

The signal S3 indicating the position information of the objective lens 27 is found by the signal processing circuit 15 carrying out arithmetic processing with respect to the following equation (23).

$$S3=(SD+SE)-(SF+SG) \quad (23)$$

The signal S3 indicating the position information of the objective lens 27 generated by the signal processing circuit 15 is supplied to the servo control section 19 via the optical disc controller 14.

Under the control of the optical disc controller 14, the servo control section 19 drives the biaxial actuator 28 of the optical pickup 20 on the basis of the signal S3 indicating the position information of the objective lens 27.

As the biaxial actuator 28 is driven by the servo control section 19 in response to the signal S3 indicating the position information of the objective lens 27, the biaxial actuator 28 carries out midpoint servo for minutely moving the objective lens 27 held by the lens holding section 31 into the direction of radius of the optical disc 11 so as to instantaneously correct the position deviation of the objective lens 27 with respect to the base 21 of the optical pickup 20 and the portions fixed thereto, and thus controls the objective lens 27 to be located constantly at the normal position.

In the optical disc device 10 of this embodiment, since the access operation of the optical pickup 20 is carried out while the midpoint servo is carried out as described above, the high-speed access property is realized.

Also, in the optical disc device 10 of this embodiment, since the tracking error signal TR3 can be detected by the so-called push-pull method, the grating 47 for splitting a light beam and the light-receiving sections for receiving side beams split by the grating 47 are no longer necessary, thus enabling simplification of the structure.

As described above, in the optical disc device to which the present invention is applied, the position deviation of the objective lens 27 at the time of access operation or the like of the optical pickup 20 is detected, and the midpoint servo is carried out for minutely moving the objective lens 27 in the direction of radius of the optical disc 11 so as to instantaneously correct the position deviation of the objective lens 27 with respect to the base 21 of the optical pickup 20 and the portions fixed thereto. Therefore, the accuracy and stability of the access operation of the optical pickup 20 can be secured and the high-speed access property can be realized.

Also, in the optical disc device 10 to which the present invention is applied, the position deviation of the objective lens 27 is detected by using the hologram 48 or the Foucault prism 62 of the optical pickup 20 for generating a focusing error signal by the Foucault method, without separately providing any means for detecting the position deviation of the objective lens 27. Therefore, the position deviation of the objective lens can be detected appropriately and simply, and the high-speed access property can be realized without causing the increase in the number of component parts, the increase in size of the device itself and the rise in cost.

Moreover, in the optical disc device 10 to which the present invention is applied, the center light-receiving section of the photodetector IC 44, 62 is divided by the division line d3, d5 parallel to the boundary 48a of the hologram 48 or the boundary 53a of the Foucault prism 53, and the respective parts of the return light beam of the main beam split by the hologram 48 are received by the two light-receiving sections generated by division by the division line d3, d5 parallel to the boundary 48a of the hologram 48 or the boundary 53a of the Foucault prism 53. Therefore, for example, even when the position on the photodetector IC 44, 62 of the return light beam spot of the light beam in the focused state is slightly changed in the case where a change of the oscillation wavelength is generated in the semiconductor laser element 41 or in the case where a change in the refractive index is generated in the optical member 43, 51, 61 because of a temperature change, it is possible to effectively restrain generation of any deviation of the signal level of a focusing error signal due to the position change of the return light beam spot, and to detect an appropriate focusing error signal.

Also, in the optical disc device 10 to which the present invention is applied, the grating 47 as the light beam splitting means, the hologram 48, 52 as the optical path branching means, and the Foucault prism 53 as the return light beam splitting means are integrally formed in the optical member 43, 51, 61. Therefore, alignment of these members is not necessary. Thus, it is possible to simplify the operation of assembling the optical pickup 20 and to reduce the number of component parts and the cost.

The optical member 43, 51, 61 can be easily prepared by injection-molding of a resin material or by glass press molding.

In the optical disc device 10 to which the present invention is applied, the semiconductor laser element 41 of the optical pickup 20, the photodetector IC 44, 62, and the optical member 43, 51, 61 are constituted as the integrated optical element 40, 50, 60. Therefore, alignment of these members is not necessary. Thus, it is possible to further simplify the operation of assembling the optical pickup 20 and to further reduce the number of component parts and the cost. Also, reduction in size and thickness of the overall device can be realized.

In the above description, the optical disc device has an optical pickup of a non-polarization optical system for recording/reproducing signals to/from a compact disc (CD) or a CD-ROM. However, this invention is not limited to the above-described embodiments and can also be applied an optical disc device having an optical pickup of a polarization optical system for recording/reproducing signals to/from a magneto-optical disc (MO) or the like.

Industrial Applicability

According to the integrated optical element of the present invention, since the position deviation of the light beam converging means with respect to the integrated optical element at the time of access to a desired recording track on the optical disc can be detected, the optical pickup using this integrated optical element can realize the high-speed access property.

Also, in this integrated optical element, the optical path branching means or the return light beam splitting means is used for detecting the position deviation of the light beam converging means with respect to the integrated optical element, instead of additionally providing any means for detecting the position deviation of the light beam converging means. Therefore, the optical pickup using this integrated optical element can realize the high-speed access property by appropriately and simply detecting the position deviation of the light beam converging means, without causing the increase in the number of components, the increase in the size of the device itself and the rise in cost.

According to the optical pickup of the present invention, since the position deviation of the light beam converging means with respect to the optical member at the time of access to a desired recording track on the optical disc can be detected, the position of the light beam converging means can be instantaneously recovered to secure the accuracy and stability of the access operation and to realize the high-speed access property.

Also, in this optical pickup according to the present invention, the optical path branching means or the return light beam splitting means is used for detecting the position deviation of the light beam converging means with respect to the optical member, instead of additionally providing any means for detecting the position deviation of the light beam converging means. Therefore, the optical pickup can realize the high-speed access property by appropriately and simply detecting the position deviation of the light beam converging means, without causing the increase in the number of components, the increase in the size of the device itself and the rise in cost.

According to the optical disc device of the present invention, since the position deviation of the light beam converging means with respect to the optical member at the time when causing the optical pickup to access a desired recording track on the optical disc can be detected, the position of the light beam converging means can be instantaneously recovered to secure the accuracy and stability of the access operation and to realize the high-speed access property.

Also, in this optical disc device according to the present invention, the optical path branching means or the return light beam splitting means of the optical pickup is used for detecting the position deviation of the light beam converging means with respect to the optical member, instead of additionally providing any means for detecting the position deviation of the light beam converging means. Therefore, the optical disc device can realize the high-speed access property by appropriately and simply detecting the position deviation of the light beam converging means, without causing the increase in the number of components, the increase in the size of the device itself and the rise in cost.

What is claimed is:

1. An integrated optical element used for an optical pickup for carrying out recording and/or reproduction of signals by irradiating a signal recording surface of an optical disc with a light beam, comprising:

a light source for emitting the light beam;

a photodetector having a light-receiving section for receiving a return light beam reflected by the signal recording surface of the optical disc;

a package member for housing the light source and the photodetector therein;

an optical member arranged on the package member for transmitting the light beam emitted from the light source and for transmitting the return light beam directed toward the photodetector; and optical path branching means integrally formed with the optical member for separating the optical path of the light beam emitted from the light source and the optical path of the return light beam directed toward the photodetector;

the optical path branching means having at least two diffraction areas for diffracting the return light beam reflected by the signal recording surface of the optical disc, into different directions, respectively, the boundary between the diffraction areas being inclined at a predetermined angle with respect to the direction corresponding to the direction of radius of the optical disc;

at least one light-receiving section of the photodetector being divided into a portion for receiving a return light beam diffracted by one diffraction area of the optical path branching means and a portion for receiving a return light beam diffracted by the other diffraction area.

2. The integrated optical element as claimed in claim 1, wherein the optical path branching means is made of a hologram formed on the surface of optical member.

3. The integrated optical element as claimed in claim 2, wherein the optical member has a first surface on which the light beam emitted from the light source is incident and a second surface which is substantially parallel to the first surface and on which the return light beam reflected by the signal recording surface of the optical disc is incident, and wherein the hologram as the optical path branching means is formed on the second surface.

4. The integrated optical element as claimed in claim 1, wherein light beam splitting means for diffracting the light beam directed toward the optical disc and for splitting the light beam into a plurality of beams including a main beam and two side beams is formed integrally with the optical member.

5. The integrated optical element as claimed in claim 4, wherein light beam splitting means for diffracting the light beam directed toward the optical disc and for splitting the light beam into a plurality of beams including a main beam and two side beams is formed on the first surface of the optical member.

6. The integrated optical element as claimed in claim 1, wherein the optical path branching means is formed so that the boundary between the diffraction areas is inclined at 15 degrees or more with respect to the direction corresponding to the direction of radius of the optical disc.

7. The integrated optical element as claimed in claim 1, wherein at least one light-receiving section of the photodetector is divided by a division line substantially parallel to the boundary between the diffraction areas of the optical path branching means.

8. An integrated optical element used for an optical pickup for carrying out recording and/or reproduction of signals by irradiating a signal recording surface of an optical disc with a light beam, comprising:

a light source for emitting the light beam;

a photodetector having a light-receiving section for receiving a return light beam reflected by the signal recording surface of the optical disc;

a package member for housing the light source and the photodetector therein;

an optical member arranged on the package member for transmitting the light beam emitted from the light source and for transmitting the return light beam directed toward the photodetector;

optical path branching means integrally formed with the optical member for separating the optical path of the light beam emitted from the light source and the optical path of the return light beam reflected by the signal recording surface of the optical disc; and return light beam splitting means integrally formed with the optical member for splitting the return light beam passed through the optical path branching means into at least two beams;

the return light beam splitting means having at least two surfaces having different normal vectors, the boundary between these surfaces being inclined at a predetermined angle with respect to a direction corresponding to the direction of radius of the optical disc;

at least one light-receiving section of the photodetector being divided into a portion for receiving one return light beam generated by the return light beam splitting means and a portion for receiving the other return light beam.

9. The integrated optical element as claimed in claim 8, wherein the optical path branching means is made of a hologram formed on a surface of optical member.

10. The integrated optical element as claimed in claim 9, wherein the optical member has a first surface on which the light beam emitted from the light source is incident and a second surface which is substantially parallel to the first surface and on which the return light beam reflected by the signal recording surface of the optical disc is incident, and wherein the return light beam splitting means is formed on the first surface and the hologram as the optical path branching means is formed on the second surface.

11. The integrated optical element as claimed in claim 8, wherein light beam splitting means for diffracting the light beam directed toward the optical disc and for splitting the light beam into a plurality of beams including a main beam and two side beams is formed integrally with the optical member.

12. The integrated optical element as claimed in claim 11, wherein light beam splitting means for diffracting the light beam directed toward the optical disc and for splitting the light beam into a plurality of beams including a main beam and two side beams is formed on the first surface of the optical member.

13. The integrated optical element as claimed in claim 8, wherein the optical path branching means is formed so that the boundary is inclined at 15 degrees or more with respect to the direction corresponding to the direction of radius of the optical disc.

14. The integrated optical element as claimed in claim 8, wherein at least one light-receiving section of the photodetector is divided by a division line substantially parallel to the boundary of the return light beam splitting means.

15. An optical pickup for carrying out recording and/or reproduction of signals by irradiating a signal recording surface of an optical disc with a light beam, comprising:

a light source for emitting the light beam;

light beam converging means for converging the light beam emitted from the light source and for irradiating the signal recording surface of the optical disc with the converged light beam;

a photodetector having a light-receiving section for receiving a return light beam reflected by the signal recording surface of the optical disc;

an optical member arranged between the light source and photodetector on one side and the light beam converging means on the other side, for transmitting the light beam emitted from the light source and for transmitting the return light beam directed toward the photodetector;

optical path branching means integrally formed with the optical member for separating the optical path of the light beam emitted from the light source and the optical path of the return light beam directed toward the photodetector; and a biaxial actuator for moving the light beam converging means into biaxial directions, that is, the direction of radius of the optical disc and the direction toward and away from the optical disc;

the optical path branching means having at least two diffraction areas for diffracting the return light beam reflected by the signal recording surface of the optical disc, into different directions, respectively, the boundary between the diffraction areas being inclined at a predetermined angle with respect to the direction corresponding to the direction of radius of the optical disc;

at least one light-receiving section of the photodetector being divided into a portion for receiving a return light beam diffracted by one diffraction area of the optical path branching means and a portion for receiving a return light beam diffracted by the other diffraction area.

16. An optical pickup for carrying out recording and/or reproduction of signals by irradiating a signal recording surface of an optical disc with a light beam, comprising:

a light source for emitting the light beam;

light beam converging means for converging the light beam emitted from the light source and for irradiating the signal recording surface of the optical disc with the converged light beam;

a photodetector having a light-receiving section for receiving a return light beam reflected by the signal recording surface of the optical disc;

an optical member arranged between the light source and photodetector on one side and the light beam converging means on the other side, for transmitting the light beam emitted from the light source and for transmitting the return light beam directed toward the photodetector;

optical path branching means integrally formed with the optical member for separating the optical path of the light beam emitted from the light source and the optical path of the return light beam reflected by the signal recording surface of the optical disc;

return light beam splitting means integrally formed with the optical member for splitting the return light beam passed through the optical path branching means into at least two beams; and a biaxial actuator for moving the light beam converging means into biaxial directions, that is, the direction of radius of the optical disc and the direction toward and away from the optical disc;

the return light beam splitting means having at least two surfaces having different normal vectors, the boundary between these surfaces being inclined at a predetermined angle with respect to a direction corresponding to the direction of radius of the optical disc;

at least one light-receiving section of the photodetector being divided into a portion for receiving one return light beam generated by the return light beam splitting means and a portion for receiving the other return light beam.

17. An optical disc device comprising:

disc rotating means for rotating an optical disc;

an optical pickup for carrying out recording and/or reproduction of signals by irradiating with a light beam a signal recording surface of the optical disc rotated by the disc rotating means;

a signal processing circuit for processing a detection signal from the optical pickup; and an access mechanism for moving the optical pickup in the direction of radius of the optical disc;

the optical pickup comprising a light source for emitting the light beam, light beam converging means for converging the light beam emitted from the light source and for irradiating the signal recording surface of the optical disc with the converged light beam, a photodetector having a light-receiving section for receiving a return light beam reflected by the signal recording surface of the optical disc, an optical member arranged between the light source and photodetector on one side and the light beam converging means on the other side, for transmitting the light beam emitted from the light source and for transmitting the return light beam directed toward the photodetector, optical path branching means integrally formed with the optical member for separating the optical path of the light beam emitted from the light source and the optical path of the return light beam directed toward the photodetector, and a biaxial actuator for moving the light beam converging means into biaxial directions, that is, the direction of radius of the optical disc and the direction toward and away from the optical disc;

the optical path branching means having at least two diffraction areas for diffracting the return light beam reflected by the signal recording surface of the optical disc, into different directions, respectively, the boundary between the diffraction areas being inclined at a predetermined angle with respect to the direction corresponding to the direction of radius of the optical disc;

at least one light-receiving section of the photodetector being divided into a portion for receiving a return light beam diffracted by one diffraction area of the optical path branching means and a portion for receiving a return light beam diffracted by the other diffraction area.

18. An optical disc device comprising:

disc rotating means for rotating an optical disc;

an optical pickup for carrying out recording and/or reproduction of signals by irradiating with a light beam a signal recording surface of the optical disc rotated by the disc rotating means;

a signal processing circuit for processing a detection signal from the optical pickup; and an access mechanism for moving the optical pickup in the direction of radius of the optical disc;

the optical pickup comprising a light source for emitting the light beam, light beam converging means for converging the light beam emitted from the light source and for irradiating the signal recording surface of the optical disc with the converged light beam, a photodetector having a light-receiving section for receiving a return light beam reflected by the signal recording surface of the optical disc, an optical member arranged between the light source and photodetector on one side and the light beam converging means on the other side, for transmitting the light beam emitted from the light source and for transmitting the return light beam directed toward the photodetector, optical path branching means integrally formed with the optical member for separating the optical path of the light beam emitted from the light source and the optical path of the return light beam reflected by the signal recording surface of the optical disc, return light beam splitting means integrally formed with the optical member for splitting the return light beam passed through the optical path branching means into at least two beams, and a biaxial actuator for moving the light beam converging means into biaxial directions, that is, the direction of radius of the optical disc and the direction toward and away from the optical disc;

the return light beam splitting means having at least two surfaces having different normal vectors, the boundary between these surfaces being inclined at a predetermined angle with respect to a direction corresponding to the direction of radius of the optical disc;

at least one light-receiving section of the photodetector being divided into a portion for receiving one return light beam generated by the return light beam splitting means and a portion for receiving the other return light beam.

* * * * *